United States Patent
Sugahara et al.

(10) Patent No.: US 10,453,028 B2
(45) Date of Patent: Oct. 22, 2019

(54) STORE AND ROBOT SYSTEM

(71) Applicant: Kabushiki Kaisha Toshiba, Minato-ku (JP)

(72) Inventors: Atsushi Sugahara, Kawasaki (JP); Kazuma Komoda, Fuchu (JP); Daisuke Yamamoto, Kawasaki (JP); Takafumi Sonoura, Yokohama (JP); Haruna Eto, Arakawa (JP); Akihito Ogawa, Fujisawa (JP); Junya Tanaka, Ota (JP); Hideichi Nakamoto, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/899,702

(22) Filed: Feb. 20, 2018

(65) Prior Publication Data
US 2019/0080278 A1 Mar. 14, 2019

(30) Foreign Application Priority Data

Sep. 13, 2017 (JP) ................................ 2017-175532

(51) Int. Cl.
| G06K 15/00 | (2006.01) |
| G06Q 10/08 | (2012.01) |
| B65G 47/90 | (2006.01) |
| B25J 9/16 | (2006.01) |
| B25J 11/00 | (2006.01) |
| B25J 5/02 | (2006.01) |
| B25J 9/00 | (2006.01) |
| B25J 9/04 | (2006.01) |
| B25J 18/02 | (2006.01) |

(52) U.S. Cl.
CPC .............. *G06Q 10/087* (2013.01); *B25J 5/02* (2013.01); *B25J 9/0018* (2013.01); *B25J 9/045* (2013.01); *B25J 9/1679* (2013.01); *B25J 11/008* (2013.01); *B25J 18/02* (2013.01); *B65G 47/905* (2013.01)

(58) Field of Classification Search
USPC ........................................................ 235/383
See application file for complete search history.

(56) References Cited

U.S. PATENT DOCUMENTS

| 5,332,363 A | 7/1994 | Tanaka et al. |
| 9,451,674 B1 * | 9/2016 | Kong .................. H05B 37/029 |

(Continued)

FOREIGN PATENT DOCUMENTS

| JP | 62-244807 | 10/1987 |
| JP | 11-222121 | 8/1999 |

(Continued)

*Primary Examiner* — Ahshik Kim
(74) *Attorney, Agent, or Firm* — Oblon, McClelland, Maier & Neustadt, L.L.P.

(57) ABSTRACT

A store of an embodiment includes a shelf, a conveyor, an elevator mechanism, a robot hand, and a robot mechanism. In the shelf, products can be displayed. The conveyor is arranged along the shelf. The conveyor is configured to convey a container in which the product is placed. The elevator mechanism is configured to move the container up and down. The robot hand is capable of griping the product. The robot mechanism is configured to perform positioning of the robot hand. The robot mechanism is configured to overlap at least a part of the conveyor in a top view.

20 Claims, 16 Drawing Sheets

(56) References Cited

U.S. PATENT DOCUMENTS

| | | | | |
|---|---|---|---|---|
| 10,112,735 | B2* | 10/2018 | Pippin | B65B 69/00 |
| 2005/0220600 | A1* | 10/2005 | Baker | B65G 1/04 |
| | | | | 414/626 |
| 2013/0096713 | A1 | 4/2013 | Takizawa et al. | |
| 2015/0073589 | A1* | 3/2015 | Khodl | B25J 5/007 |
| | | | | 700/218 |
| 2015/0344225 | A1 | 12/2015 | Nakamura et al. | |
| 2016/0207195 | A1 | 7/2016 | Eto et al. | |
| 2017/0107055 | A1 | 4/2017 | Magens et al. | |
| 2017/0291768 | A1* | 10/2017 | Starks | B65G 1/1376 |
| 2018/0065806 | A1 | 3/2018 | Sugahara et al. | |

FOREIGN PATENT DOCUMENTS

| | | |
|---|---|---|
| JP | 2005-53642 | 3/2005 |
| JP | 2009-202248 | 9/2009 |
| JP | 2012-1344 | 1/2012 |
| JP | 2013-86914 | 5/2013 |
| JP | 2015-224125 | 12/2015 |
| JP | 2016-132521 | 7/2016 |
| JP | 2018-39668 A | 3/2018 |
| WO | WO 2016/186061 A1 | 11/2016 |

* cited by examiner

STORE AND ROBOT SYSTEM

CROSS-REFERENCE TO RELATED APPLICATION

This application claims priority from Japanese Patent Application No. 2017-175532 filed on Sep. 13, 2017, the contents of which are incorporated herein by reference in their entirety.

FIELD

Embodiments described herein relate generally to a store and a robot system.

BACKGROUND

In a store such as a convenience store, putting products on and removing products from shelves, collection of expired products, and the like (hereinafter also referred to as "picking") are performed. Picking of products is still often performed manually. Therefore, development of a robot system which automatically performs picking of products, and a store including the robot system is required.

Meanwhile, in a store including a robot system, making an in-store layout compact may be required. On the other hand, it is necessary to make a robot system compact in order to provide the robot system in a confined space in a shop.

DETAILED DESCRIPTION

Figure 1:
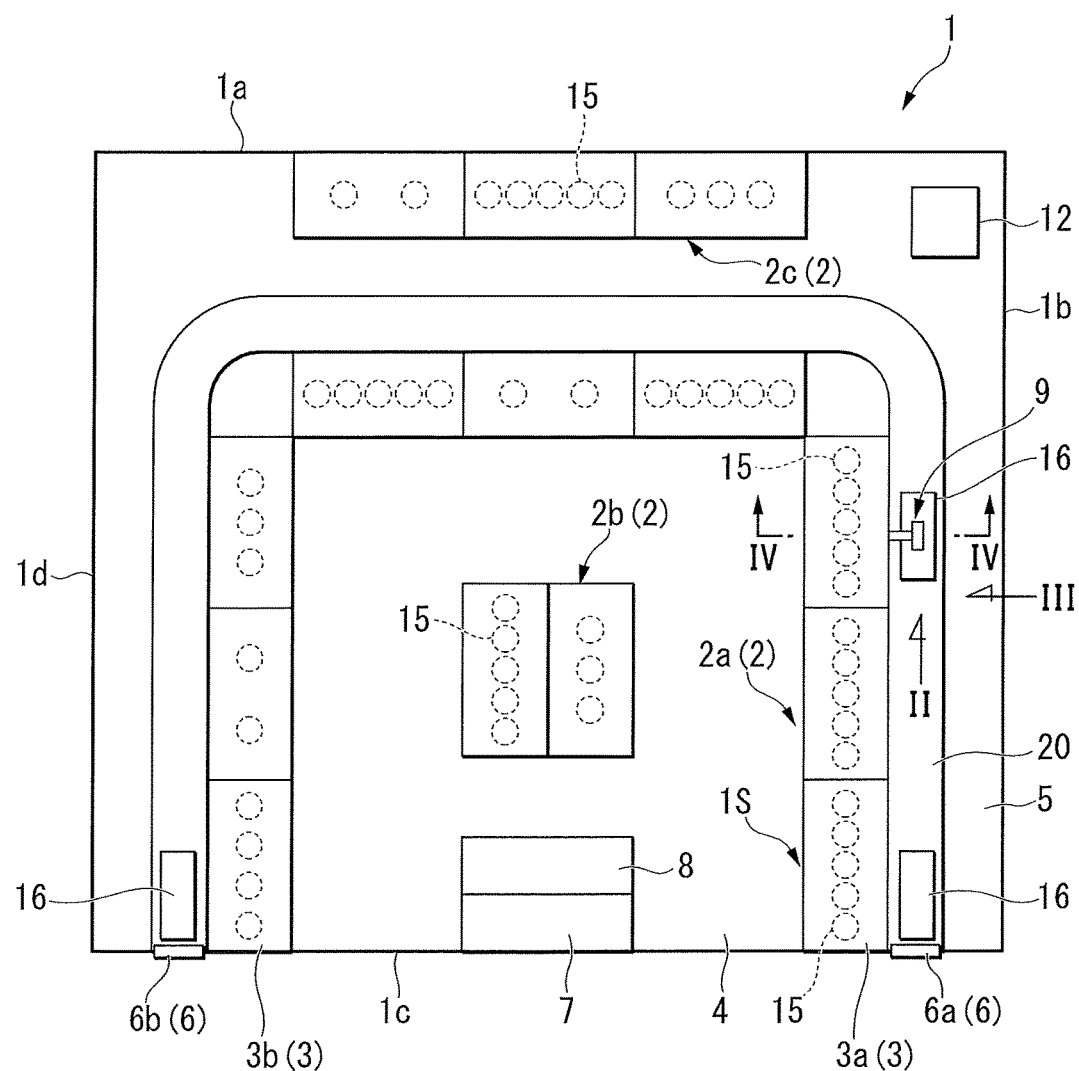
FIG. 1 is a plan view showing a store of a first embodiment.

A store of an embodiment includes a shelf, a conveyor, an elevator mechanism, a robot hand, and a robot mechanism. In the shelf, products can be displayed. The conveyor is arranged along the shelf. The conveyor is configured to convey a container in which the product is placed. The elevator mechanism is configured to move the container up and down. The robot hand is capable of griping the product. The robot mechanism is configured to perform positioning of the robot hand. The robot mechanism is configured to overlap at least a part of the conveyor in a top view.

Hereinafter, a store and a robot system according to the embodiment will be described with reference to the drawings. In each figure, the same components are denoted with the same reference numerals.

A store of the first embodiment will be described.

Figure 2:
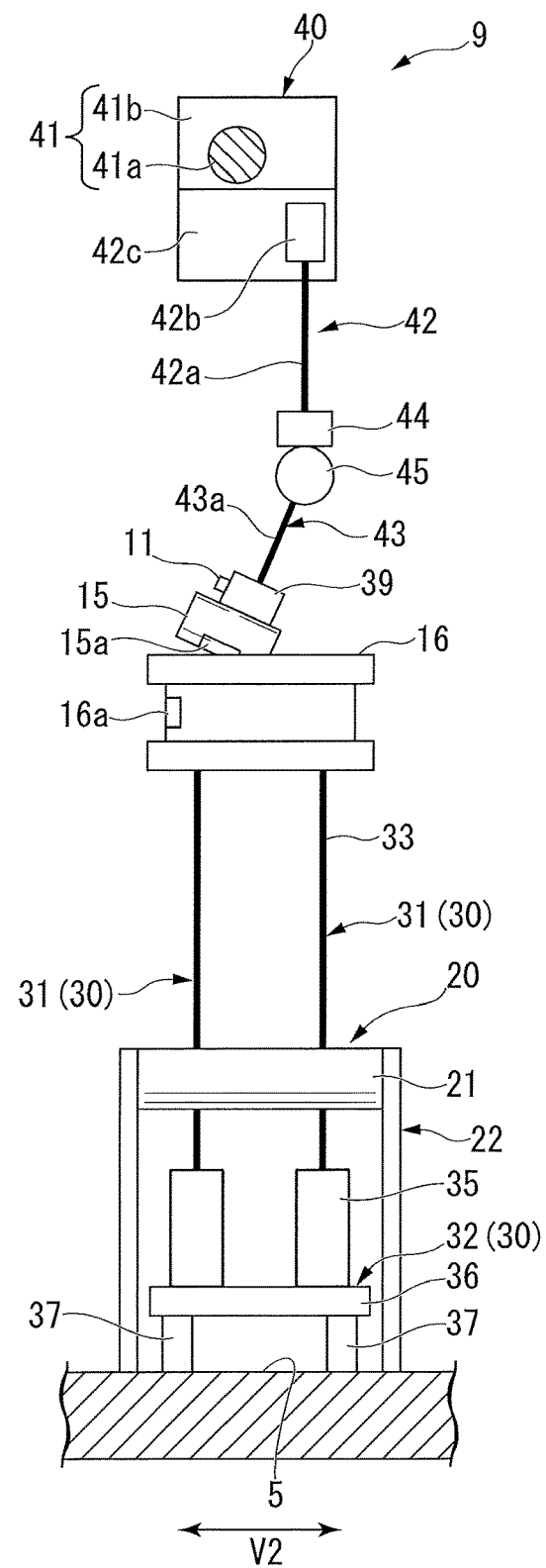
FIG. 2 is a side view showing a robot system of the first embodiment.

FIG. 1 is a plan view showing a store 1 of the first embodiment. FIG. 2 is a side view showing a robot system 9 of the first embodiment. FIG. 2 corresponds to the view of the robot system 9 of FIG. 1 when viewed from arrow II.

Figure 3:
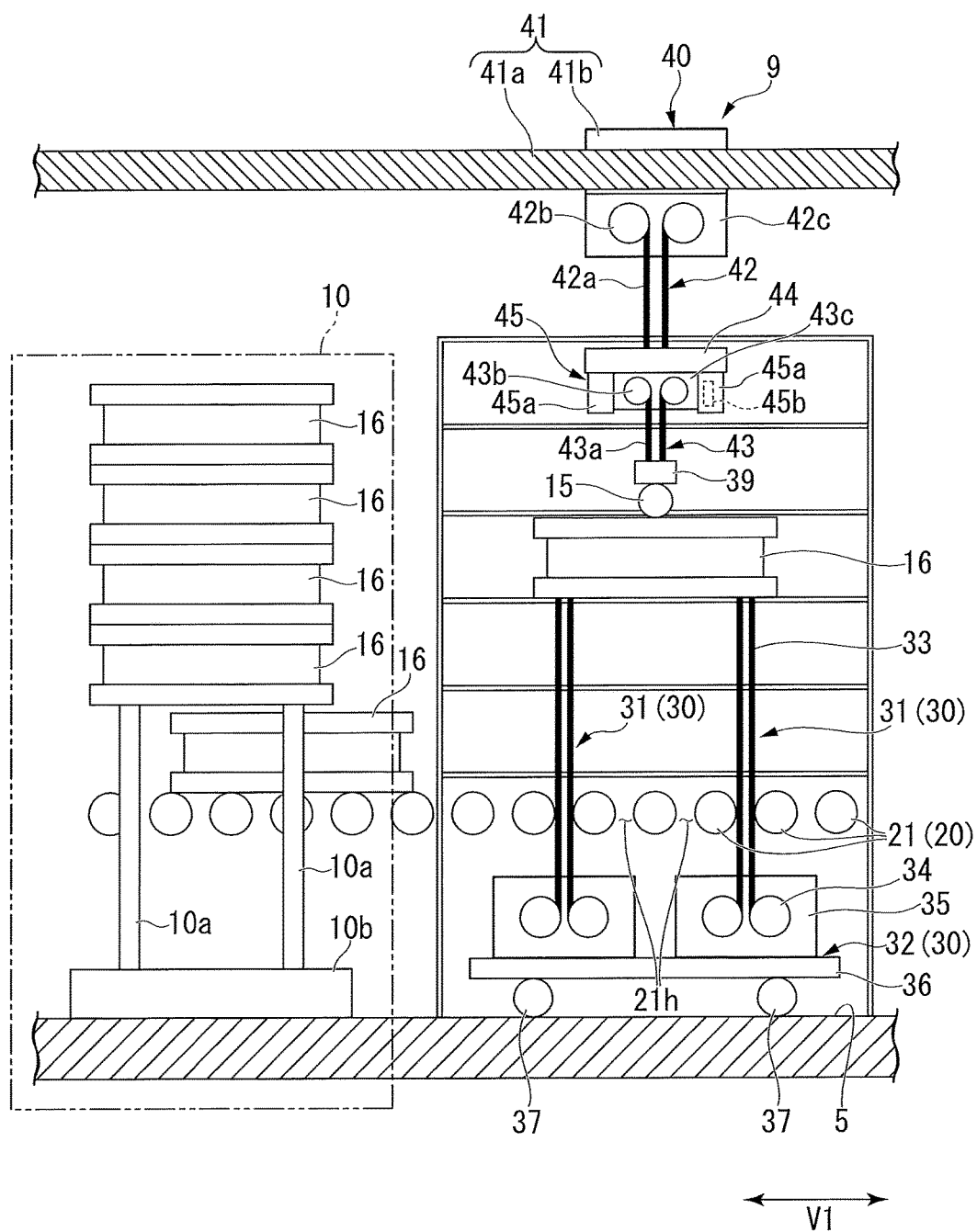
FIG. 3 is a view showing the robot system of the first embodiment together with a container feeding mechanism.

FIG. 3 is a view showing the robot system 9 of the first embodiment together with a container feeding mechanism 10. FIG. 3 corresponds to a view of the robot system 9 of FIG. 1 when viewed from an arrow III.

Figure 4:
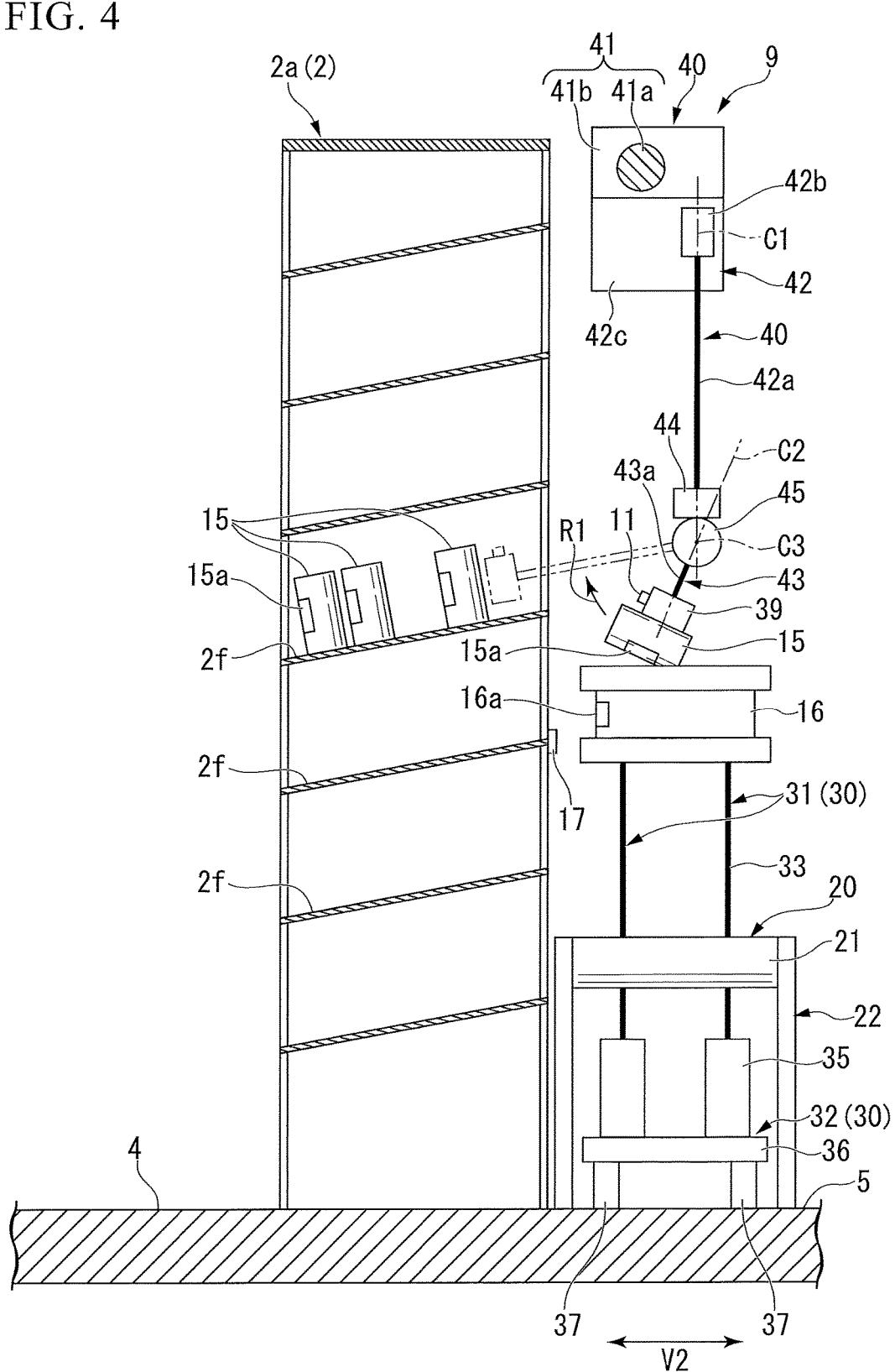
FIG. 4 is a view showing an operation of a robot mechanism of the first embodiment.

FIG. 4 is a view showing an operation of the robot mechanism 40 of the first embodiment. FIG. 4 corresponds to a view including an IV-IV cross portion of FIG. 1.

As shown in FIG. 1, the store 1 includes a shelf 2, a locker 3, a front yard 4, a back yard 5, a door 6, a store clerk stand 7, a register 8, a robot system 9, a container feeding mechanism 10 (see FIG. 4), a camera 11 (see FIG. 2), and a controller 12. In FIG. 1, the container feeding mechanism 10, the camera 11, and the like are omitted.

For example, the store 1 may be a convenience store. In the top view of FIG. 1, the store 1 has a rectangular shape. The store 1 has four walls 1a, 1b, 1c, and 1d surrounding the inside of the store 1. The four walls 1a, 1b, 1c, and 1d are a first wall 1a, a second wall 1b, a third wall 1c, and a fourth wall 1d. In the top view of FIG. 1, the four walls 1a, 1b, 1c, and 1d are arranged in order of the first wall 1a, the second wall 1b, the third wall 1c, and the fourth wall 1d in a clockwise direction. The first wall 1a is adjacent to the second wall 1b and the fourth wall 1d. The first wall 1a faces the third wall 1c. In the top view of FIG. 1, a U-shaped region 1S having a U-shape (inverted U-shape) open to the third wall 1c is provided in the store 1.

The shelf 2 will be described.

The shelf 2 is capable of displaying the products 15. In the store 1, a plurality of assembled shelves 2 (shelves) are provided. The plurality of assembled shelves 2 are an alignment shelf 2a, a central shelf 2b, and a warehouse shelf 2c.

In the top view of FIG. 1, the alignment shelf 2a meanders. The alignment shelf 2a includes a plurality of shelves aligned in the U-shaped region 1S. In the top view of FIG. 1, the alignment shelf 2a has an inverted U shape. The alignment shelf 2a has seven shelves.

The central shelf 2b includes a plurality of shelves arranged at a center of the store 1. The central shelf 2b has two shelves adjacent to each other.

The warehouse shelf 2c includes a plurality of shelves arranged along the first wall 1a. The warehouse shelf 2c includes three shelves adjacent to each other.

As shown in FIG. 4, the alignment shelf 2a includes a plurality of shelf tables 2f on which the products 15 can be placed. In the cross-sectional view of FIG. 4, the shelf table 2f is inclined to be lower in the direction from the back yard 5 toward the front yard 4. The inclination of the shelf table 2f causes the products 15 to easily go to the front yard 4 side due to a weight of the products 15, and therefore, it is possible to easily take out the products 15, which is preferable.

Referring back to FIG. 1, the locker 3 will be described.

The locker 3 can store the products 15. For example, the products 15 are loaded from the container 16 to the locker 3 by the robot system 9. For example, the locker 3 is used for mail order sales. For example, an input unit (not shown) capable of inputting a password is provided in the locker 3. In the locker 3, a specific individual (customer) can take out the products 15 by inputting a password into the input unit. For example, the products 15 ordered by a specific individual on the Internet are put in the locker 3. The products 15 are put in the locker 3 each time a specific individual places an order on the Internet.

In the store 1, a plurality of lockers 3 are provided. The plurality of lockers 3 includes an entrance side locker 3a and an exit side locker 3b.

The entrance side locker 3a is provided next to an entrance door 6a in the U-shaped region 1S. The entrance side locker 3a is adjacent to one end of the alignment shelf 2a.

The exit side locker 3b is provided next to an exit door 6b in the U-shaped region 1S. The exit side locker 3b is adjacent to the other end of the alignment shelf 2a. The exit side locker 3b faces the entrance side locker 3a with the register 8 interposed therebetween.

The front yard 4 will be described.

The front yard 4 is located on an extraction area which the products 15 are taken out from the alignment shelves 2a and the central shelf 2b. The front yard 4 is a place at which customers enter and leave the store 1. The front yard 4 is surrounded by the alignment shelf 2a, the locker 3, and the third wall 1c. The front yard 4 is a region partitioned by the U-shaped region 1S and the third wall 1c in the store 1. In the top view of FIG. 1, the front yard 4 has a rectangular shape.

The back yard 5 will be described.

The back yard 5 is located on the side opposite to the front yard 4 with the alignment shelf 2a and the locker 3 interposed therebetween. The back yard 5 functions as a warehouse for the products 15 in the store 1. The back yard 5 is a place at which putting the products 15 on the shelf is performed. The back yard 5 is surrounded by the alignment shelf 2a, the locker 3, both ends of the third wall 1c, the first wall 1a, the second wall 1b, and the fourth wall 1d. The back yard 5 is a region partitioned by the U-shaped region 1S, both ends of the third wall 1c, the first wall 1a, the second wall 1b, and the fourth wall 1d in the store 1. In the top view of FIG. 1, the back yard 5 has an inverted U shape along the U-shaped region 1S. For example, in the back yard 5, a space that one person (worker) enters is secured between the conveyor 20 and the second wall 1b (the fourth wall 1d).

The door 6 will be described.

The door 6 allows the container 16 in which the products 15 are placed to enter and leave. The door 6 is arranged at a start and an end of the conveyor 20.

A plurality of doors 6 are provided in the shop 1. The plurality of doors 6 are provided on the third wall 1c. The plurality of doors 6 includes the entrance door 6a and the exit door 6b.

The entrance door 6a is arranged at the start of the conveyor 20.

The exit door 6b is arranged at the end of the conveyor 20.

The store clerk stand 7 will be described.

The store clerk stand 7 is a place at which a store clerk stands. The store clerk stand 7 is arranged along the third wall 1c.

The register 8 will be described.

The register 8 is a place at which a customer pays money when the customer purchases products 15. The register 8 is arranged adjacent to the clerk stand 7 to face the central shelf 2b.

The robot system 9 will be described.

As shown in FIG. 2, the robot system 9 includes a conveyor 20, an elevator mechanism 30, a robot hand 39, and a robot mechanism 40. For example, only one robot system 9 is provided.

As shown in FIG. 1, the robot system 9 is arranged in the back yard 5. As shown in FIG. 4, the conveyor 20, the elevator mechanism 30, and the robot mechanism 40 in the robot system 9 are arranged in the back yard 5. At the time of an operation of the robot mechanism 40, the robot hand 39 is moved to the inside of the shelf 2 (see an alternating two-dots-dashed line in FIG. 4).

The conveyor 20 will be described.

As shown in FIG. 1, the conveyor 20 is arranged in the back yard 5. In the top view of FIG. 1, the conveyor 20 meanders. The conveyor 20 is arranged along the U-shaped region 1S. In the top view of FIG. 1, the conveyor 20 has an inverted U shape.

Figure 5:
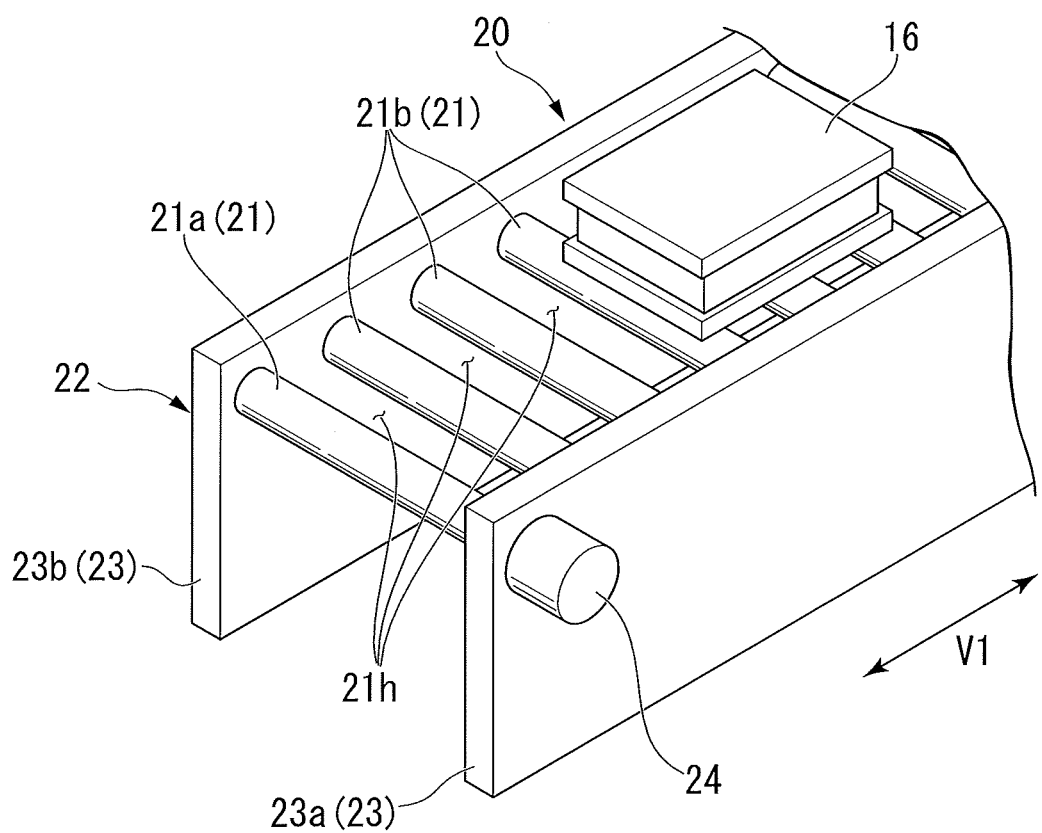
FIG. 5 is a perspective view showing a conveyor according to the first embodiment.

FIG. 5 is a perspective view showing the conveyor 20 of the first embodiment.

As shown in FIG. 5, the conveyor 20 includes a roller 21 and a support mechanism 22. The conveyor 20 includes a plurality of rollers 21. In the embodiment, the conveyor 20 is a roller conveyor in which the plurality of rollers 21 are arranged with a gap 21h therebetween. The conveyor 20 conveys the container 16 placed on the plurality of rollers 21.

The plurality of rollers 21 include a driving roller 21a and a driven roller 21b. For example, only one driving roller 21a is provided. For example, a plurality of driven rollers 21b are provided. The driving roller 21a is rotated by driving of a motor 24. The driven roller 21b rotates according to the rotation of the driving roller 21a.

The support mechanism 22 rotatably supports the rollers 21. The support mechanism 22 includes a support wall 23, a motor 24, and a power transmission mechanism (not shown). The support mechanism 22 includes a pair of support walls 23.

The pair of support walls 23 rotatably support both ends of the roller 21. The pair of support walls 23 includes a first support wall 23a and a second support wall 23b. That is, the conveyor 20 has a doubly supported structure.

The motor 24 can rotate the driving roller 21a. The motor 24 is attached to the first support wall 23a.

The power transmission mechanism transmits rotational power of the driving roller 21a to the plurality of driven rollers 21b. For example, the power transmission mechanism is incorporated in the first support wall 23a.

Referring back to FIG. 2, the elevator mechanism 30 will be described.

The elevator mechanism 30 moves the container. 16 up and down. As shown in FIG. 2, the elevator mechanism 30 includes an elevation mechanism 31 and a movement mechanism 32.

The elevation mechanism 31 will be described.

The elevation mechanism 31 moves the container 16 up and down. As shown in FIG. 3, the elevation mechanism 31 includes a meshing chain 33 (gap passing member) that moves up and down through the gap 21h between the plurality of rollers 21.

The elevation mechanism 31 includes the meshing chain 33, a driver 34, and a storage 35.

The meshing chain 33 is a chain which becomes one strong columnar body by engaging two chains. A distal end (upper end) of the meshing chain 33 can come in contact with a bottom portion of the container 16.

For example, the driver 34 includes a motor and a gear. The motor can rotate the gear.

The meshing chain 33 moves up and down by the gear engaging with the meshing chain 33 due to driving of the motor.

The storage 35 is capable of storing the meshing chain 33. The storage 35 can store two chains which are disengaged from each other in a compact manner.

The elevator mechanism 30 includes four elevation mechanisms 31. The four elevation mechanisms 31 are arranged at intervals in a conveyor extending direction V1 and a conveyor width direction V2 (see FIG. 2).

Here, the conveyor extending direction V1 means a direction along the conveyor 20 arranged along the U-shaped region 1S (see FIG. 1). In other words, the conveyor extending direction V1 is an arrangement direction of the plurality of rollers 21.

The conveyor width direction V2 means a direction orthogonal to the conveyor extending direction V1 and parallel to a horizontal plane. In other words, the conveyor width direction V2 is an axial direction of the rollers 21.

The movement mechanism 32 will be described. As shown in FIG. 2, the movement mechanism 32 is arranged to fall within the width of the conveyor 20. The movement mechanism 32 is capable of moving the elevation mechanism 31 in the conveyor extending direction V1 (see FIG. 3). The movement mechanism 32 is movable independently of a suspension movement mechanism 41.

The movement mechanism 32 includes a support table 36 and driving wheels 37. In the embodiment, the movement mechanism 32 is a bogie.

The support table 36 supports the four elevation mechanisms 31 from below. The support table 36 has a rectangular plate shape. The four elevation mechanisms 31 are attached to four corners of an upper surface of the support table 36.

The driving wheel 37 can move the support table 36. The movement mechanism 32 includes four driving wheels 37. The four driving wheels 37 are attached to four corners of a lower surface of the support table 36.

The robot hand 39 will be described.

The robot hand 39 can grip the product 15. For example, the robot hand 39 includes a plurality of finger portions (not shown) that can grip the product 15. The robot hand 39 can grip or release the products 15 through opening and closing operations of a plurality of finger portions.

The robot mechanism 40 will be described.

The robot mechanism 40 performs positioning of the robot hand 39. The robot mechanism 40 includes a suspension movement mechanism 41, a first extension and retraction mechanism 42, a second extension and retraction mechanism 43, a base 44, and a rotation mechanism 45.

The suspension movement mechanism 41 will be described.

As shown in FIG. 3, the suspension movement mechanism 41 includes a rail 41a and a carriage 41b.

The rail 41a slidably supports the carriage 41b. The rail 41a extends along the conveyor 20. For example, an actuator (not shown) capable of moving the carriage 41b along the rail 41a is incorporated into the rail 41a.

On the lower surface of the carriage 41b, a first extension and retraction side storage 42c is fixed.

By the first extension and retraction side storage 42c moving along the rail 41a due to driving of the actuator, the first extension and retraction mechanism 42, the base 44, the rotation mechanism 45, the second extension and retraction mechanism 43, and the robot hand 39 integrally move along the rail 41a.

The first extension and retraction mechanism 42 will be described.

The first extension and retraction mechanism 42 includes a meshing chain 42a (hereinafter also referred to as a "first extension and retraction side chain 42a"), a driver 42b (hereinafter also referred to as a "first extension and retraction side driver 42b"), and a storage 42c (hereinafter also referred to as a "first extension and retraction side storage 42c").

The first extension and retraction side chain 42a is a chain that becomes one solid columnar body by engaging two chains. Hereinafter, an axis C1 of the first extension and retraction side chain 42a which is the columnar body is also referred to as a "first extension and retraction axis C1" (see FIG. 4). The first extension and retraction axis C1 is a virtual straight line parallel to a vertical line. A distal end (a lower end) of the first extension and retraction side chain 42a is fixed to an upper surface of the base 44.

For example, the first extension and retraction side driver 42b includes a motor (hereinafter also referred to as a "first extension and retraction side motor") and a gear (hereinafter also referred to as a "first extension and retraction side gear").

The first extension and retraction side motor can rotate the first extension and retraction side gear.

The first extension and retraction side chain 42a extends and retracts by the first extension and retraction side gear meshing with the first extension and retraction side chain 42a due to driving of the first extension and retraction side motor.

The first extension and retraction side storage 42c can store the first extension and retraction side chain 42a. The first extension and retraction side storage 42c can compactly store two chains which are disengaged.

The second extension and retraction mechanism 43 will be described.

The second extension and retraction mechanism 43 includes a meshing chain 43a (hereinafter also referred to as a "second extension and retraction side chain 43a"), a driver 43b (hereinafter also referred to as a "second extension and retraction side driver 43b"), and a storage 43c (hereinafter also referred to as a "second extension and retraction side storage 43c").

The second extension and retraction side chain 43a is a chain which becomes one solid columnar body by engaging two chains. Hereinafter, an axis C2 of the second extension and retraction side chain 43a which is the columnar body is also referred to as a "second extension and retraction axis C2" (see FIG. 4). A distal end (lower end) of the second extension and retraction side chain 43a is fixed to a base of the robot hand 39.

For example, the second extension and retraction side driver 43b includes a motor (hereinafter also referred to as a "second extension and retraction side motor") and a gear (hereinafter also referred to as a "second extension and retraction side gear").

The second extension and retraction side motor can rotate the second extension and retraction side gear.

When the second extension and retraction side gear meshes with the second extension and retraction side chain 43a by driving of the second extension and retraction side motor, the second extension and retraction side chain 43a extends and retracts.

The second extension and retraction side storage 43c is capable of storing the second extension and retraction side chain 43a. The second extension and retraction side storage 43c can compactly store the two disengaged chains.

The base 44 will be described.

For example, the base 44 is a rectangular parallelepiped support member. A lower end of the first extension and retraction side chain 42a is fixed to an upper surface of the base 44. The rotation mechanism 45 is fixed to the lower surface of the base 44.

The rotation mechanism 45 will be described.

For example, the rotation mechanism 45 includes a vertical wall 45a and a motor 45b (not shown). The rotation mechanism 45 includes a pair of vertical walls 45a.

The pair of vertical walls 45a rotatably supports the second extension and retraction side storage 43c.

The motor 45b can rotate the second extension and retraction side storage 43c around an axis C3 (hereinafter also referred to as a "rotation axis C3") parallel to the conveyor extending direction V1 (a direction of the arrow R1 in FIG. 4) (see FIG. 4). For example, the motor 45b is built into one side of the pair of vertical walls 45a.

When the second extension and retraction side storage 43c is rotated in the direction of the arrow R1 in FIG. 4 by the driving of the motor 45b, the second extension and retraction mechanism 43 rotates within a vertical plane together with the robot hand 39.

An arrangement of the robot system 9 will be described.

In the top view of FIG. 1, the robot system 9 overlaps the conveyor 20. As shown in FIG. 2, the robot mechanism 40 in the robot system 9 overlaps the conveyor 20 in a top view. In the top view, the robot mechanism 40 is arranged to be within the width of the conveyor 20. In the top view, the robot mechanism 40 is arranged to overlap the rollers 21 within the width of the conveyor 20.

Referring back to FIG. 3, the container feeding mechanism 10 will be described.

As shown in FIG. 3, the container feeding mechanism 10 moves the container 16 up and down. The container feeding mechanism 10 includes an arm 10a that moves up and down adjacent to the conveyor 20.

The container feeding mechanism 10 includes the arm 10a and a stage 10b.

The container feeding mechanism 10 includes four arms 10a. The four arms 10a are arranged at intervals in the conveyor extending direction V1 and the conveyor width direction V2 (see FIG. 2).

The arm 10a can be vertically extended and retracted. The arm 10a includes a gripper (not shown) capable of gripping a flange of the container 16. The arm 10a is vertically extended and retracted in a state in which the flange of the container 16 is gripped from the side by the gripper, such that the container 16 can be moved up and down. FIG. 3 shows an example in which the arm 10a is extended upwardly in a state in which the flange of the second container from below from among five laminated containers 16 is gripped by the gripper.

The stage 10b is fixed to a floor surface. The stage 10b supports a base (lower end) of the arm 10a.

Referring back to FIG. 2, the camera 11 will be described.

The camera 11 is capable of imaging the products 15. An imaging result of the camera 11 is sent to the controller 12 (see FIG. 1). As shown in FIG. 2, the camera 11 is provided in the robot hand 39.

Referring back to FIG. 1, the controller 12 will be described.

The controller 12 performs overall control of each element of the store 1. The controller 12 controls the robot system 9 and the container feeding mechanism 10 (see FIG. 3) on the basis of the imaging result of the camera 11 (see FIG. 2). The controller 12 controls the robot hand 39 and the robot mechanism 40 on the basis of the imaging result of the camera 11 (see FIG. 2).

The controller 12 controls the robot system 9 and the container feeding mechanism 10 (see FIG. 3) such that a specific product 15 is put on the specific shelf 2 or locker 3 on the basis of preset information. The controller 12 places the container 16 in which the specific product 15 is put (hereinafter also referred to as a "specific container 16") on the conveyor 20 by controlling the container feeding mechanism 10. In FIG. 3, an example in which the container feeding mechanism 10 lifts four containers 16 using the arm 10a and places the first (bottommost) container 16 from the bottom on the conveyor 20 is shown.

As shown in FIG. 4, for example, a barcode 16a is provided on the container 16. A barcode reader 17 that reads the barcode 16a is provided on the shelf 2. A reading result of the barcode reader 17 is sent to the controller 12 (see FIG. 1). The controller 12 controls the robot system 9 on the basis of the reading result of the barcode reader 17. The controller 12 controls the conveyor 20 such that a specific container 16 is stopped in front of a specific shelf 2. The controller 12 controls the elevator mechanism 30, the robot hand 39, and the robot mechanism 40 so that the specific container 16 is stopped in front of a specific shelf 2 and then the specific product 15 is put on the specific shelf 2.

The controller 12 controls the elevator mechanism 30 and the robot mechanism 40 so that the robot system 9 stops in front of the specific shelf 2 on the basis of the reading result of the barcode reader 17. The controller 12 controls the suspension movement mechanism 41 so that the robot hand 39 is stopped in front of the specific shelf 2. The controller 12 controls the movement mechanism 32 so that the elevation mechanism 31 is stopped in front of the specific shelf 2.

On the basis of the reading result of the barcode reader 17, the controller 12 controls the elevator mechanism 30 so that the specific container 16 stops before the specific shelf table 2f. The controller 12 controls the driver 34 (see FIG. 3) of the elevation mechanism 31 to extend the meshing chain 33 and stop the specific container 16 in front of the specific shelf table 2f.

The controller 12 controls the first extension and retraction mechanism 42 so that the robot hand 39 can grip the specific product 15. The controller 12 controls the first extension and retraction side driver 42b to extend the first extension and retraction side chain 42a, and stop the robot hand 39 in front of the specific product 15. The controller 12 causes the robot hand 39 to grip the specific product 15 by controlling the robot hand 39.

After the robot hand 39 grips the specific product 15, the controller 12 controls the rotation mechanism 45 and the second extension and retraction mechanism 43 to put the specific product 15 in the specific shelf 2. The controller 12 controls the motor 45b (see FIG. 3) of the rotation mechanism 45 to rotate the robot hand 39 around the rotation axis C3 and direct the robot hand 39 onto the specific shelf 2.

Here, a label 15a for the product 15 is provided on the product 15. For example, the label 15a is printed or affixed on a surface on which a picture of the product 15 is displayed. The controller 12 acquires position information of the label 15a on the basis of the imaging result of the camera 11. The controller 12 controls the robot hand 39 and the robot mechanism 40 so that the label 15a faces one side (front yard 4 side) of the shelf 2.

After directing the robot hand 39 toward the inside of the specific shelf 2, the controller 12 controls the second extension and retraction side driver 43b (see FIG. 3) to extend the second extension and retraction side chain 43a and put the robot hand 39 in the specific shelf 2. After placing the robot hand 39 in the specific shelf 2, the controller 12 controls the robot hand 39 to cause the robot hand 39 to release the specific product 15. The controller 12 puts the specific product 15 in the specific shelf 2 by separating the specific product 15 from the robot hand 39.

According to the first embodiment, the store 1 includes the shelf 2, the conveyor 20, the elevator mechanism 30, the robot hand 39, and the robot mechanism 40. The shelf 2 is capable of displaying the products 15. The conveyor 20 is arranged along the shelf 2. The conveyor 20 conveys the container 16 in which the products 15 are placed. The elevator mechanism 30 moves the container 16 up and down. The robot hand 39 can grip the product 15. The robot mechanism 40 performs positioning of the robot hand 39. The robot mechanism 40 overlaps the conveyor 20 in a top view. With the above configuration, the following effects are obtained. Since the robot mechanism 40 overlaps the conveyor 20 in a top view, it is possible to provide the store 1 with a more compact in-store layout than in a case in which the robot mechanism 40 is separated from the conveyor 20 without overlapping the conveyor 20 in a top view.

Further, since the robot mechanism 40 entirely overlaps the conveyor 20 in a top view, it is possible to make the in-store layout compact as much as possible.

When the robot provided in the gap between the shelf and the conveyor is inverted to pick up a product between the shelf and the conveyor, an installation space for the shelves, the conveyor, and the robot is required, and therefore, it may be difficult to make the in-store layout compact. On the other hand, according to the first embodiment, since the robot mechanism 40 overlaps the conveyor 20 in a top view, it is possible to share an installation space of the conveyor 20 and the robot mechanism 40, and therefore, it is easy to make the in-store layout compact.

Further, the store 1 further includes a front yard 4 and a back yard 5. The front yard 4 is located on the extraction area which the products 15 are taken out from the shelf 2. The back yard 5 is located on the side opposite to the front yard 4 with the shelf 2 interposed therebetween. The conveyor 20, the elevator mechanism 30, and the robot mechanism 40 are arranged in the back yard 5. With the above configuration, the following effects are obtained. Since the conveyor 20, the elevator mechanism 30, and the robot mechanism 40 are collected in the back yard 5, sufficient space for the front yard 4 can be secured. Further, the robot system 9 can be arranged in a reduced space even when a space of the back yard 5 is only as large as that allowing one person to enter.

Further, the conveyor 20 is a roller conveyor in which the plurality of rollers 21 are arranged with the gap 21h therebetween. The elevator mechanism 30 includes the meshing chain 33 that moves up and down through the gap 21h. With the above configuration, the following effects are obtained. Even when the container 16 is moved up and down by the elevator mechanism 30, the vertical movement of the container 16 can be performed within the width of the conveyor 20 by extending the meshing chain 33 via the gap 21h. Therefore, it is possible to realize the vertical movement of the container 16 in a reduced space.

Further, since the elevator mechanism 30 overlaps the conveyor 20 in a top view, it is possible to achieve a compact in-store layout in contrast with a case in which the elevator mechanism 30 is separated from the conveyor 20 without overlapping the conveyor 20 in a top view.

Further, since the store 1 further includes the doors 6 that are arranged at the start and the end of the conveyor 20 and through which the container 16 can enter and leave, the following effects are obtained. The present embodiment is preferable since the container 16 can enter and leave through the door 6. For example, a conveying vehicle can stop outside the entrance door 6a, and the container 16 can be carried onto the start of the conveyor 20 from the conveying vehicle through the entrance door 6a. On the other hand, the conveying vehicle can stop outside the exit door 6b, and the container 16 can be conveyed off the end of the conveyor 20 to the conveying vehicle through the exit door 6b.

Further, since the alignment shelf 2a and the conveyor 20 meander with respect to each other in a top view, the following effects are obtained. It is possible to secure a wider arrangement space of the alignment shelf 2a and the conveyor 20 as compared with a case in which the alignment shelf 2a and the conveyor 20 are linearly arranged.

Further, the store 1 further includes the camera 11 and the controller 12. The camera 11 is capable of imaging the products 15. The controller 12 controls the robot hand 39 and the robot mechanism 40 on the basis of the imaging result of the camera 11. With the above configuration, the following effects are obtained. By controlling the robot hand 39 on the basis of the imaging result of the camera 11, it is possible to cause the robot hand 39 to grip the specific product 15. Further, by controlling the robot mechanism 40 on the basis of the imaging result of the camera 11, the robot hand 39 can be put on the specific shelf 2. Therefore, it is possible to automatically and accurately perform the operation of putting the specific product 15 in the specific shelf 2.

Further, the label 15a of the products 15 is provided on the products 15. The controller 12 acquires the position information of the label 15a on the basis of the imaging result of the camera 11. The controller 12 controls the robot hand 39 and the robot mechanism 40 so that the label 15a is directed to one side of the shelf 2. With the above configuration, the following effects are obtained. It is possible to direct the label 15a side of the product 15 toward the take-out side of the product 15 when the specific product 15 is put on the specific shelf 2. Therefore, the present embodiment is preferable since the label 15a is visually recognized from the take-out side of the products 15 and it becomes easier to select the target product 15.

According to the first embodiment, the robot system 9 has the conveyor 20, the elevator mechanism 30, the robot hand 39, and the robot mechanism 40. The conveyor 20 conveys the container 16 in which the products 15 are placed. The elevator mechanism 30 moves the container 16 up and down. The robot hand 39 can grip the product 15. The robot mechanism 40 performs positioning of the robot hand 39. The robot mechanism 40 overlaps the conveyor 20 in a top view. With the above configuration, the following effects are obtained. Since the robot mechanism 40 overlaps the conveyor 20 in a top view, it is possible to make the robot system 9 compact as compared with the case in which the robot mechanism 40 is separated from the conveyor 20 without overlapping the conveyor 20 in a top view.

Further, since the robot mechanism 40 entirely overlaps the conveyor 20 in a top view, the robot system 9 can be made compact as much as possible.

Further, the conveyor 20 is the roller conveyor in which the plurality of rollers 21 are arranged with the gap 21*h* therebetween. The elevator mechanism 30 includes the meshing chain 33 that moves up and down through the gap 21*h*. With the above configuration, the following effects are obtained. Even when the container 16 is moved up and down by the elevator mechanism 30, the vertical movement of the container 16 can be performed within the width of the conveyor 20 by extending the meshing chain 33 via the gap 21*h*. Therefore, it is possible to realize the vertical movement of the container 16 in a reduced space.

Further, since the elevator mechanism 30 overlaps the conveyor 20 in a top view, it is possible to make the robot system 9 more compact as compared with a case in which the elevator mechanism 30 is separated from the conveyor 20 without overlapping the conveyor 20 in a top view.

Further, since the gap passing member is the meshing chain 33, the following effects are obtained. It is possible to achieve space saving, high speed operation, and high stopping precision as compared with a case in which the gap passing member is a cylinder.

Further, the elevator mechanism 30 includes the elevation mechanism 31 and the movement mechanism 32. The elevation mechanism 31 moves the container 16 up and down. The movement mechanism 32 is capable of moving the elevation mechanism 31 in the direction along the conveyor 20. With the above configuration, the following effects are obtained. By driving the movement mechanism 32, it is possible to stop the elevation mechanism 31 in front of the specific shelf 2. Further, due to driving of the elevation mechanism 31, it is possible to stop the specific container 16 in front of the specific shelf table 2*f*. Therefore, it is possible to automatically perform the operation of stopping the specific container 16 in front of the specific shelf table 2*f*.

Further, since the movement mechanism 32 can move independently of the suspension movement mechanism 41, the following effects are obtained. Since the movement mechanism 32 can be moved independently of the suspension movement mechanism 41 along the conveyor 20, it is possible to improve stopping accuracy in the movement mechanism 32 itself as compared with a case in which the movement mechanism 32 can move in synchronization with the suspension movement mechanism 41. Therefore, the present embodiment is suitable since the meshing chain 33 overlaps the gap 21*h* with high accuracy in a top view.

A modification example of the first embodiment will be described.

In the first embodiment, the case in which only one robot system 9 is provided has been described, but the present embodiment is not limited thereto. For example, two or more robot systems 9 may be provided. For example, one robot system 9 may be provided for each shelf. For example, a plurality of robot systems 9 may gather and operate in a place at which one robot system 9 is not sufficient in the back yard 5.

Further, in the first embodiment, the case in which the robot mechanism 40 entirely overlaps the conveyor 20 in a top view has been described, but the present embodiment is not limited thereto. For example, the robot mechanism 40 may overlap a part of the conveyor 20 in a top view. That is, the robot mechanism 40 may overlap at least a part of the conveyor 20 in a top view.

Further, in the first embodiment, the case in which the robot hand 39 includes a plurality of finger portions has been described, but the present embodiment is not limited thereto. For example, the robot hand 39 may have an attractor capable of adsorbing the product 15.

Further, in the first embodiment, the case in which the movement mechanism 32 can move independently of the suspension movement mechanism 41 has been described, but the present embodiment is not limited thereto. For example, the movement mechanism 32 may be movable in synchronization with the suspension movement mechanism 41.

Further, in the first embodiment, the case in which the lower end of the second extension and retraction side chain 43*a* is fixed to the base of the robot hand 39 has been described, but the present embodiment is not limited thereto. For example, a hand rotation mechanism capable of rotating the robot hand 39 around the second extension and retraction axis C2 may be provided between the lower end of the second extension and retraction side chain 43*a* and the base of the robot hand 39.

Further, in the first embodiment, the case in which the camera 11 is provided in the robot hand 39 has been described, but the present embodiment is not limited thereto. For example, the camera 11 may be provided on the shelf 2, the base 44 and the walls 1*a*, 1*b*, 1*c*, and 1*d*.

Further, in the first embodiment, the case in which the stage 10*b* is fixed to the floor surface has been described, but the present embodiment is not limited thereto. For example, the stage 10*b* may be movable in the conveyor extending direction V1.

Further, in the first embodiment, a case in which the products 15 are placed in the locker 3 each time a specific individual performs ordering on the Internet has been described, but the present embodiment is not limited thereto. For example, products 15 always placed in the locker 3 may be preset. For example, the product 15 taken out by a specific individual everyday may be always placed in the locker 3.

A robot system of the second embodiment will be described.

Figure 6:
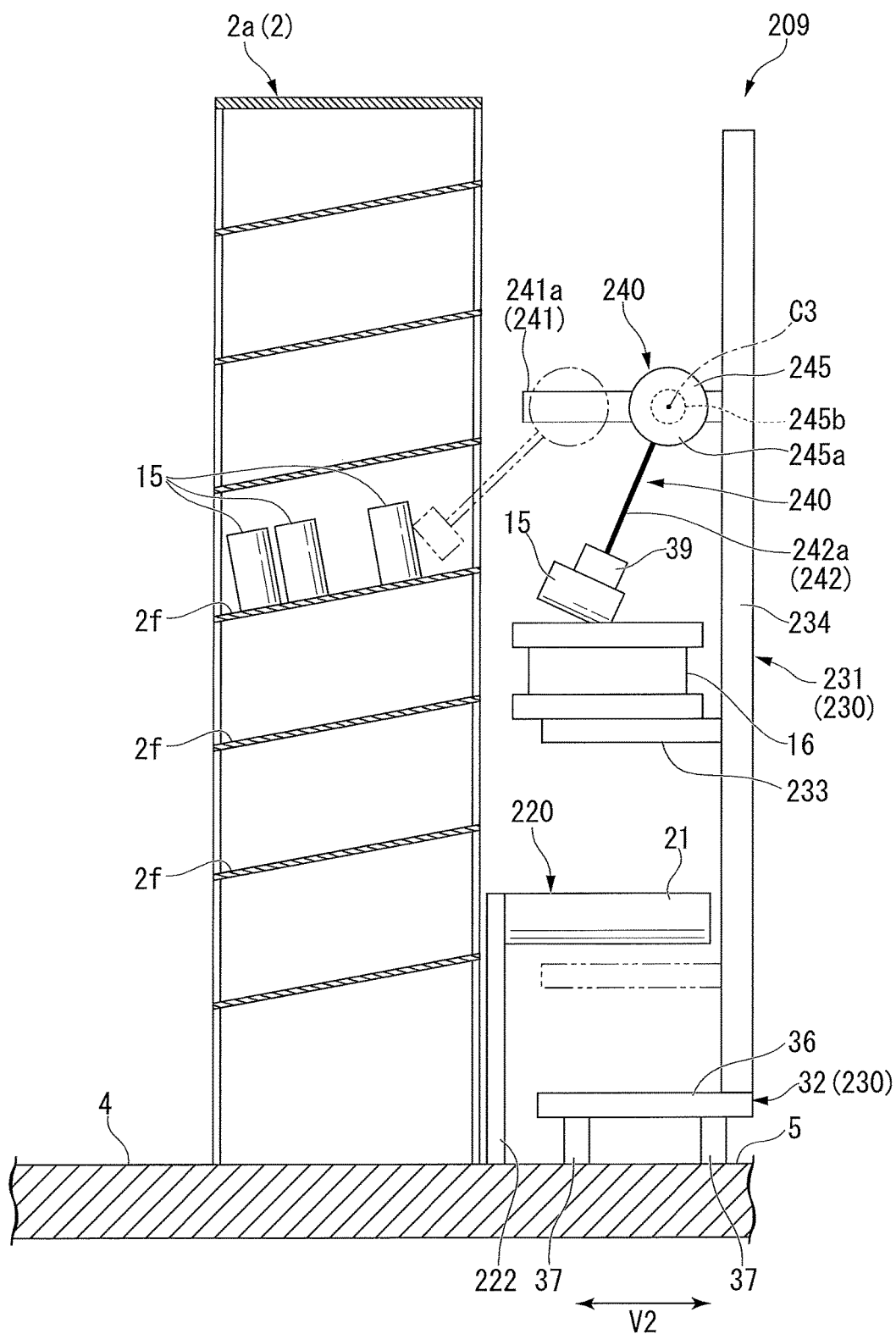
FIG. 6 is a side view showing a robot system according to a second embodiment.

FIG. 6 is a side view showing a robot system 209 of the second embodiment. FIG. 6 is a view showing an operation of a robot mechanism 240 according to the second embodiment, which corresponds to FIG. 4.

Figure 7:
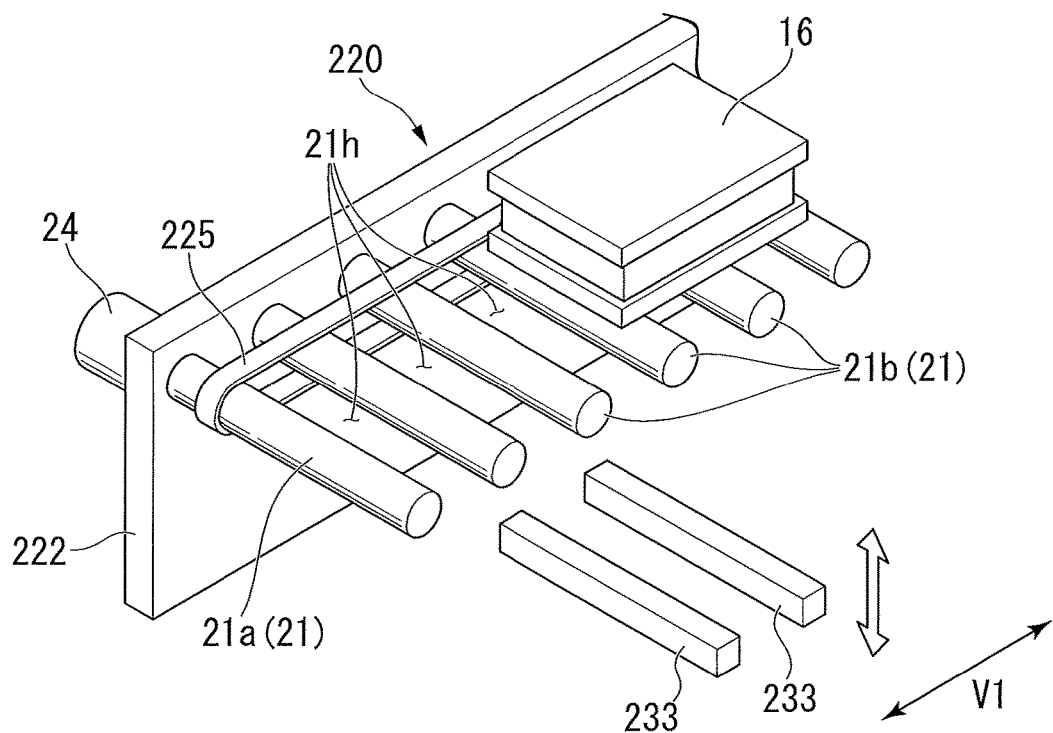
FIG. 7 is a perspective view showing a conveyor according to the second embodiment.

FIG. 7 is a perspective view showing a conveyor 220 of the second embodiment.

As shown in FIG. 6, the second embodiment is different from the first embodiment in a configuration of the robot system 209. In the second embodiment, components that are the same as those in the first embodiment are denoted with the same reference numerals, and a detailed description thereof will be omitted here.

The robot system 209 will be described.

The robot system 209 includes a conveyor 220, an elevator mechanism 230, a robot hand 39, and a robot mechanism 240. At the time of an operation of the robot mechanism 40, a robot hand 39 is moved to the inside of the shelf 2 (see an alternating two-dots-dashed line in FIG. 6).

The conveyor 220 will be described.

As shown in FIG. 6, the conveyor 220 is arranged in a back yard 5. As shown in FIG. 7, the conveyor 220 includes a roller 21, a support wall 222, a motor 24, and a power transmission member 225. The conveyor 220 includes a plurality of rollers 21. In the embodiment, the conveyor 220 is a roller conveyor in which the plurality of rollers 21 are arranged with a gap 21h therebetween. The conveyor 220 conveys the container 16 placed on the plurality of rollers 21.

The support wall 222 rotatably supports the roller 21. In the embodiment, the support wall 222 rotatably supports one end of the roller 21. That is, the conveyor 220 has a cantilever structure.

The motor 24 can rotate the driving roller 21a. The motor 24 is attached to the support wall 222.

The power transmission member 225 transmits rotational power of the driving roller 21a to the plurality of driven rollers 21b. The power transmission member 225 is laid across the plurality of rollers 21. The power transmission member 225 is arranged closer to the support wall 222 to avoid the container 16. In the embodiment, the power transmission member 225 is an endless belt.

Referring back to FIG. 6, the elevator mechanism 230 will be described.

The elevator mechanism 230 moves the container 16 up and down. As shown in FIG. 6, the elevator mechanism 230 includes an elevation mechanism 231 and a movement mechanism 32.

The elevation mechanism 231 will be described.

The elevation mechanism 231 moves the container 16 up and down. The elevation mechanism 231 includes a fork 233 (gap passing member) which moves up and down through the gap 21h (see FIG. 7) between a plurality of rollers 21. Before moving up, the fork 233 is located between the roller 21 and the support table 36 in a vertical direction (see an alternating two-dots-dashed line in FIG. 6).

The elevation mechanism 231 includes the fork 233 and a lifter 234.

As shown in FIG. 7, the fork 233 has a rectangular parallelepiped shape. The elevation mechanism 231 includes two forks 233. The two forks 233 are arranged with an interval therebetween in the conveyor extending direction V1. An upper surface of the fork 233 can contact a bottom portion of the container 16.

As shown in FIG. 6, the lifter 234 slidably supports the fork 233 and the rail 241a. The lifter 234 has a columnar shape extending vertically. The lifter 234 is arranged next to the conveyor 220. For example, an actuator (not shown) capable of moving the fork 233 and the rail 241a along the lifter 234 is incorporated in the lifter 234.

The movement mechanism 32 will be described.

The movement mechanism 32 is arranged to overlap a part of the conveyor 220 in a top view. The movement mechanism 32 can move the elevation mechanism 231 in the conveyor extending direction V1.

The support table 36 supports the elevation mechanism 231 from below. The lifter 234 of the elevation mechanism 231 is attached to an end opposite to the support wall 222 on the upper surface of the support table 36.

The robot mechanism 240 will be described.

The robot mechanism 240 performs positioning of the robot hand 39. The robot mechanism 240 includes a suspension movement mechanism 241, an extension and retraction mechanism 242, and a rotation mechanism 245.

The suspension movement mechanism 241 will be described.

The suspension movement mechanism 241 includes a rail 241a and a carriage (not shown).

The rail 241a slidably supports the carriage. The rail 241a extends parallel to the fork 233. For example, an actuator (not shown) capable of moving the carriage along the rail 241a is incorporated in the rail 241a.

The rotation mechanism 245 is fixed to the carriage.

The rotation mechanism 245, the extension and retraction mechanism 242, and the robot hand 39 are integrally moved along the rail 241a by the carriage moving along the rail 241a due to driving of the actuator.

The extension and retraction mechanism 242 will be described.

The extension and retraction mechanism 242 includes a meshing chain 242a, a driver (not shown), and a storage (not shown).

The meshing chain 242a is a chain which becomes one strong columnar body by engaging two chains. A distal end (lower end) of the meshing chain 242a is fixed to the base of the robot hand 39.

The rotation mechanism 245 will be described.

For example, the rotation mechanism 245 includes a vertical wall 245a and a motor 245b.

The vertical wall 245a rotatably supports a storage (not shown) of the extension and retraction mechanism 242.

The motor 245b can rotate the storage around a rotation axis C3. For example, the motor 245b is incorporated in the vertical wall 245a.

The extension and retraction mechanism 242 is rotated in the vertical plane together with the robot hand 39 by the storage rotating about the rotation axis C3 due to driving of the motor 245b.

According to the second embodiment, since the gap passing member is the fork 233, the following effects are obtained. Space saving and simplification can be achieved as compared with the case in which the gap passing member is a cylinder.

A modification example of the second embodiment will be described.

Figure 8:
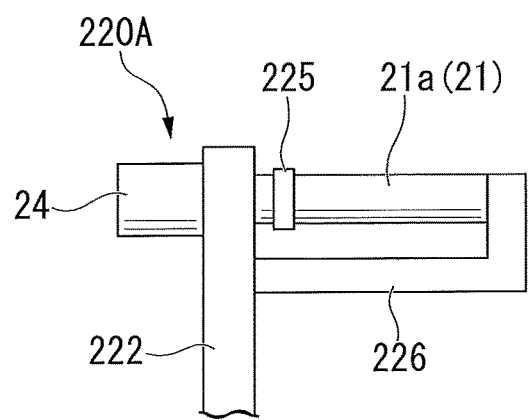
FIG. 8 is a side view showing a conveyor according to a modification example of the second embodiment.

FIG. 8 is a side view showing a conveyor 220A according to a modification example of the second embodiment.

As shown in FIG. 8, the conveyor 220A may further include a roller support member 226, in addition to the roller 21, the support wall 222, the motor 24, and the power transmission member 225.

The roller support member 226 rotatably supports the other end of the roller 21. The roller support member 226 is provided in each of the plurality of rollers 21. The roller support member 226 has an L shape by extending in parallel to the roller 21 from the support wall 222 toward the other end of the roller 21 below the roller 21 and then bending upwardly to extend to the other end of the roller 21.

According to the modification example of the second embodiment, the conveyor 220A further includes the roller support member 226 that rotatably supports the other end of the roller 21, thereby obtaining the following effects. By supporting the one end of the roller 21 using the support wall 222 and supporting the other end of the roller 21 using the roller support member 226, the conveyor 220A can have a doubly supported structure. Therefore, a support rigidity of the roller 21 can be improved, as compared with the conveyor 220 having a cantilever structure (see FIG. 7).

A conveyor storage space of the third embodiment will be described.

Figure 9:
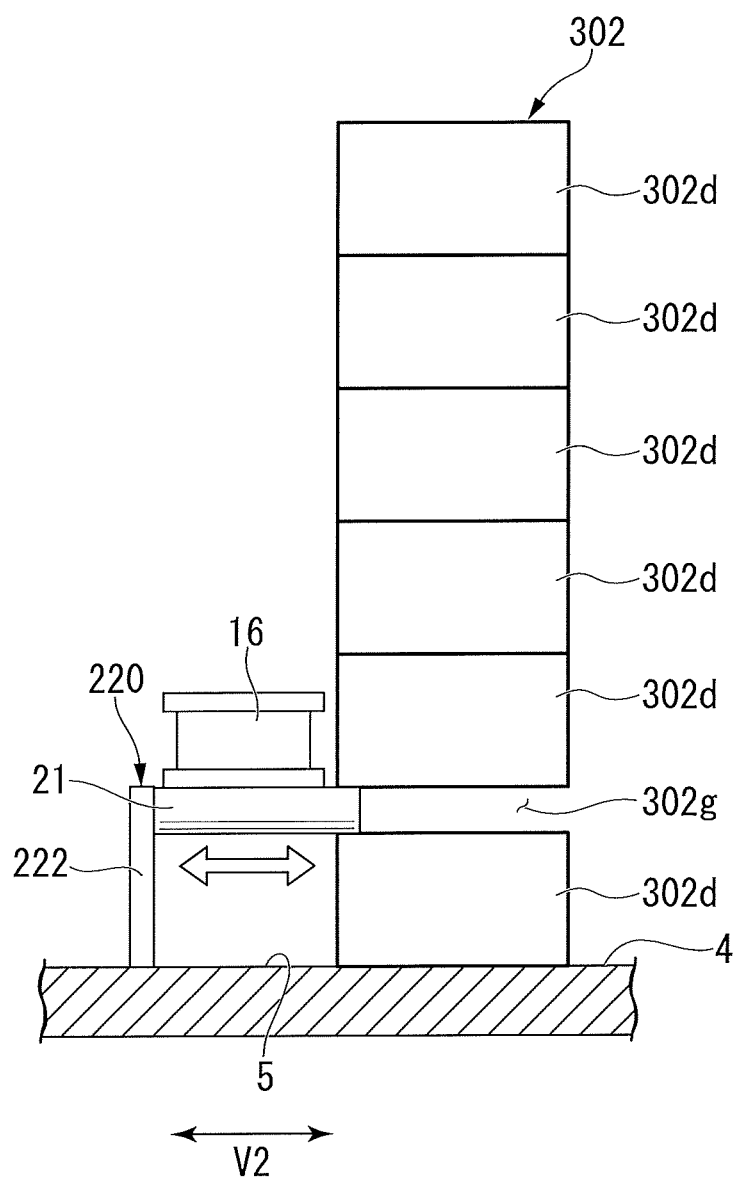
FIG. 9 is a side view showing a conveyor storage space of a third embodiment.

FIG. 9 is a side view showing a conveyor storage space 302g of the third embodiment.

Figure 10:
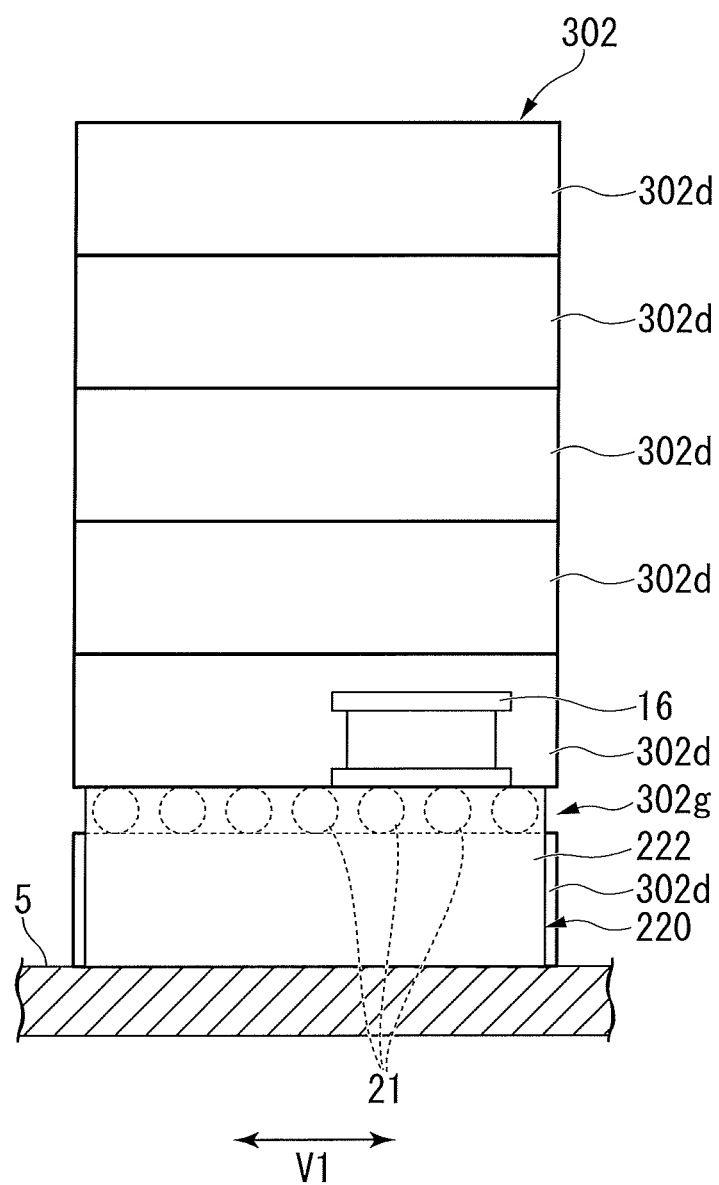
FIG. 10 is a view of the conveyor storage space of the third embodiment when viewed from a back yard side.

FIG. 10 is a view of the conveyor storage space 302g of the third embodiment when viewed from the back yard 5 side.

As shown in FIG. 9, in the third embodiment, the configuration of the shelf 302 is different from that of the second embodiment. In the third embodiment, components that are the same as those of the second embodiment are denoted with the same reference numerals, and a detailed description thereof will be omitted here.

The shelf 302 will be described.

As shown in FIG. 9, the shelf 302 includes a plurality of drawers 302d that can store products. In the side view of FIG. 9, six drawers 302d are arranged side by side in a vertical direction. The shelf 302 includes a plurality of shelves (not shown) arranged along the conveyor extending direction V1.

The conveyor storage space 302g will be described.

The shelf 302 includes a conveyor storage space 302g capable of storing the conveyor 220. The conveyor storage space 302g is located between the two drawers 302d arranged at vertical intervals in the shelf 302. The conveyor storage space 302g has a size capable of storing the plurality of rollers 21 in the conveyor 220. In FIGS. 9 and 10, an example in which the conveyor storage space 302g is located between the first (bottom layer) drawer 302d from the bottom and the second drawer 302d from the bottom is shown.

For example, an actuator (not shown) capable of moving the support wall 222 along the conveyor width direction V2 is provided on the floor surface. In other words, the actuator can bring the support wall 222 closer to and away from the shelf 302.

By bringing the support wall 222 closer to the shelf 302 due to driving of the actuator, the conveyor 220 can be stored in the conveyor storage space 302g. On the other hand, by bringing the support wall 222 away from the shelf 302 due to driving of the actuator, the conveyor 220 can be taken out from the conveyor storage space 302g.

The conveyor 220 can be taken out from the conveyor storage space 302g to the back yard 5 side. The conveyors 220 can be taken out individually for each of a plurality of shelves (not shown) arranged along the conveyor extending direction V1.

According to the third embodiment, the conveyor storage space 302g capable of storing the conveyor 220 is provided in the shelf 302, thereby obtaining the following effects. By storing the conveyor 220 in the conveyor storage space 302g, it is possible to make the in-store layout compact as compared with a case in which the conveyor 220 is always installed on the back yard 5. For example, when an operator is in the back yard 5, it is possible to secure a work space for the operator by storing the conveyor 220 in the conveyor storage space 302g.

A modification example of the third embodiment will be described.

In the third embodiment, the case in which the conveyor 220 can be taken out from the conveyor storage space 302g toward the back yard 5 has been described, but the present embodiment is not limited thereto. For example, the conveyor 220 may be able to be taken out from the conveyor storage space 302g to the front yard 4 side. For example, when a customer is in the front yard 4, the conveyor 220 may be stored in the conveyor storage space 302g, and therefore, it is possible to secure a space in front of the shelf 302.

Further, in the third embodiment, the case in which the conveyors 220 can be taken out individually for each of a plurality of shelves (not shown) arranged along the conveyor extending direction V1 has been described, but the present embodiment is not limited thereto. For example, the conveyors 220 may be integrally and collectively removable with respect to the plurality of shelves arranged along the conveyor extending direction V1.

A concealment mechanism of a fourth embodiment will be described.

Figure 11:
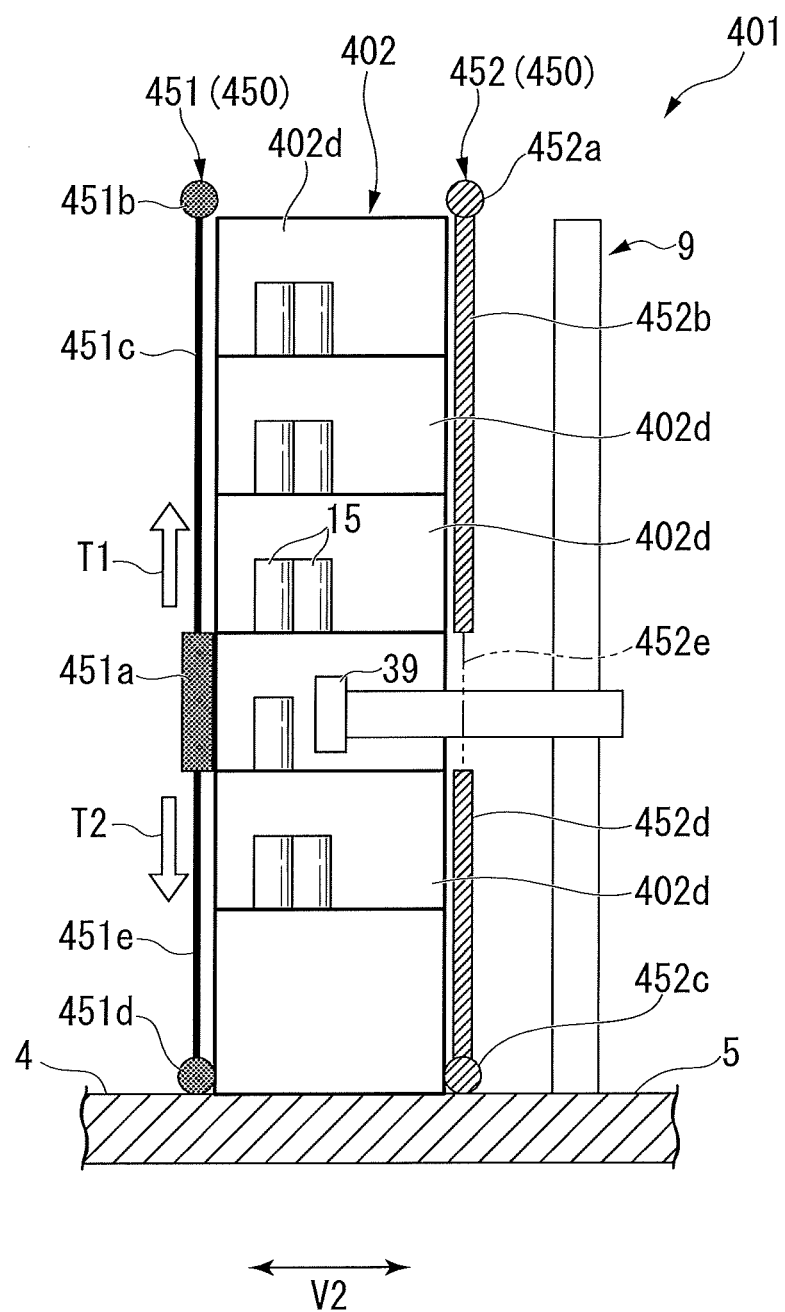
FIG. 11 is a side view showing a concealment mechanism of a fourth embodiment.

FIG. 11 is a side view showing a concealment mechanism 450 of the fourth embodiment.

Figure 12:
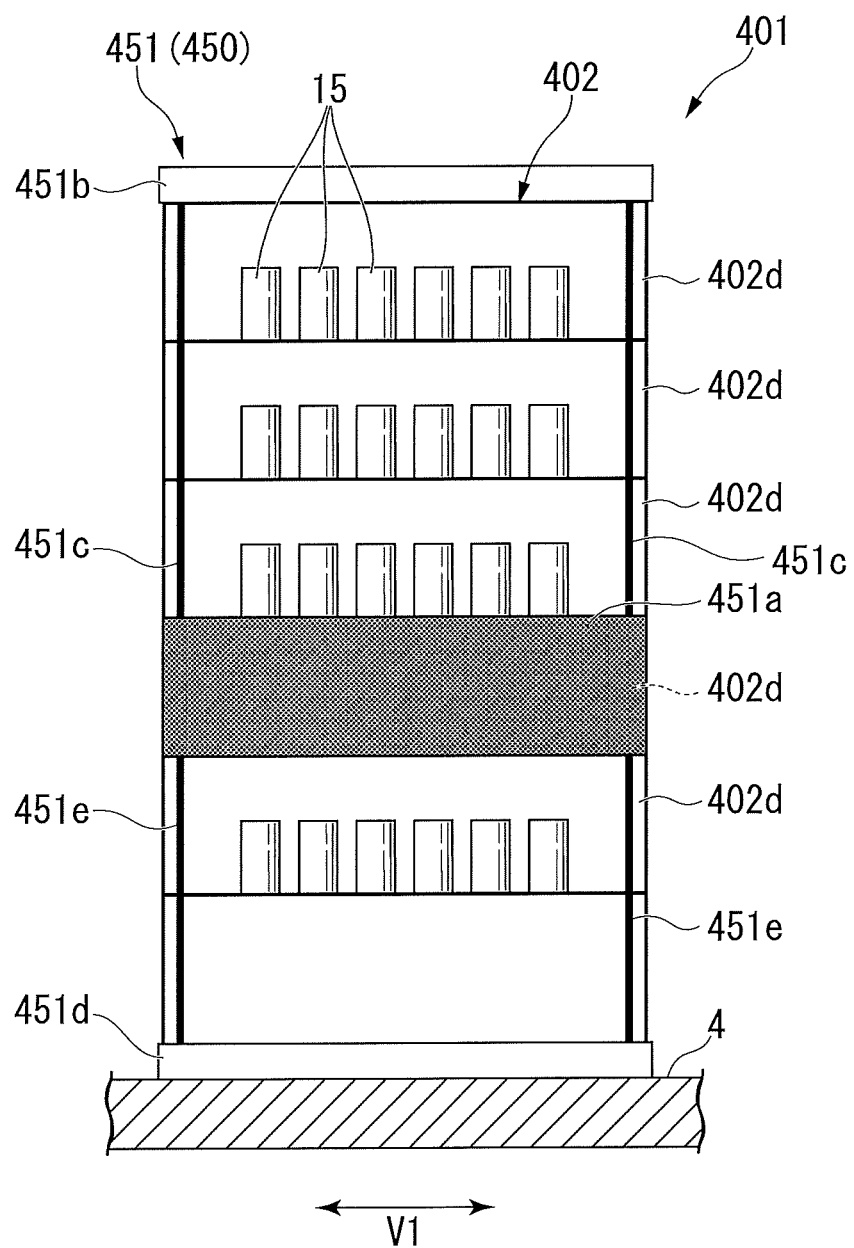
FIG. 12 is a view of the concealment mechanism of the fourth embodiment when viewed from a front yard side.

FIG. 12 is a view of the concealment mechanism 450 of the fourth embodiment when viewed from the front yard 4 side.

As shown in FIG. 11, the fourth embodiment is different from the first embodiment in the configuration of the shelf 402. In the fourth embodiment, components that are the same as those of the first embodiment are denoted with the same reference numerals, and a detailed description thereof will be omitted here.

The shelf 402 will be described.

As shown in FIG. 11, the shelf 402 includes a plurality of drawers 402d that can store the products 15. In the side view of FIG. 11, five drawers 402d are arranged in upper and lower portions respectively. The drawer 402d has a longitudinal side in the conveyor extending direction V1. FIG. 11 shows an example in which the robot system 9 including the robot hand 39 is simplified.

The concealment mechanism 450 will be described.

The concealment mechanism 450 capable of hiding at least a part of the shelf 402 is provided next to the shelf 402. A plurality of concealment mechanisms 450 are provided next to the shelf 402. The plurality of concealment mechanisms 450 includes a first concealment mechanism 451 and a second concealment mechanism 452.

The first concealment mechanism 451 will be described.

The first concealment mechanism 451 is capable of concealing the drawer 402d that is being accessed by the robot hand 39 when viewed from the extraction area which the products 15 are taken out from the shelf 402 (the side of the front yard 4). The first concealment mechanism 451 is provided on the front yard 4 side. The first concealment mechanism 451 includes a concealment plate 451a, a ceiling side towing mechanism 451b, a ceiling side rope 451c, a floor surface side towing mechanism 451d, and a floor surface side rope 451e.

As shown in FIG. 12, the concealment plate 451a has a size capable of concealing one drawer 402d when viewed from the front yard 4 side. The concealment plate 451a has a rectangular shape having a longitudinal side along the drawer 402d.

The ceiling side towing mechanism 451b is provided on the ceiling side of the store 401. The ceiling side rope 451c is connected to the ceiling side towing mechanism 451b and the upper end of the concealment plate 451a. A pair of ceiling side ropes 451c are provided with an interval therebetween in the longitudinal direction of the concealment plate 451a. The concealment plate 451a can be raised by towing the ceiling side rope 451c upwardly (in a direction of an arrow T1 in FIG. 11) due to driving of the ceiling side towing mechanism 451b.

The floor surface side towing mechanism 451d is provided on the floor surface side of the store 401. The floor surface side rope 451e is connected to the floor surface side towing mechanism 451d and the lower end of the concealment plate 451a. A pair of floor surface side ropes 451e are provided with an interval therebetween in a longitudinal direction of the concealment plate 451a to be located on a line extending from the pair of ceiling side ropes 451c. The concealment plate 451a can be lowered by towing the floor surface side rope 451e downwardly (a direction of an arrow T2 in FIG. 11) due to driving of the floor surface side towing mechanism 451d.

For example, the controller 12 (see FIG. 1) controls the ceiling side towing mechanism 451*b* and the floor surface side towing mechanism 451*d* to conceal the drawer 402*d* that is being accessed by the robot hand 39 when viewed from the front yard 4 side on the basis of the position information of the robot hand 39.

The second concealment mechanism 452 will be described.

As shown in FIG. 11, the second concealment mechanism 452 can conceal at least a part of the shelf 402 from the side (the back yard 5 side) opposite to the side on which the products 15 are taken out from the shelf 402 so that the robot hand 39 is concealed when viewed from the front yard 4 side. The second concealment mechanism 452 is provided on the back yard 5 side. The second concealment mechanism 452 includes a ceiling side winding mechanism 452*a*, a ceiling side curtain 452*b*, a floor surface side winding mechanism 452*c*, a floor surface side curtain 452*d*, and a connecting rope 452*e*. The second concealment mechanism 452 can operate independently of the first concealment mechanism 451.

The ceiling side winding mechanism 452*a* is provided on the ceiling side of the store 401. The ceiling side curtain 452*b* is suspended from the ceiling side winding mechanism 452*a*. The floor surface side winding mechanism 452*c* is provided on the floor surface side of the store 401. The connecting rope 452*e* connects an upper end of the floor surface side curtain 452*d* to a lower end of the ceiling side curtain 452*b*. The floor surface side curtain 452*d* is suspended from the lower end of the connecting rope 452*e*. The ceiling side curtain 452*b* and the floor surface side curtain 452*d* can move up and down in synchronization with each other.

The ceiling side curtain 452*b*, the connecting rope 452*e*, and the floor surface side curtain 452*d* can be integrally raised by winding the ceiling side curtain 452*b* upwardly due to driving of the ceiling side winding mechanism 452*a*.

The ceiling side curtain 452*b*, the connecting rope 452*e*, and the floor surface side curtain 452*d* can be integrally lowered by winding the floor surface side curtain 452*d* downwardly due to driving of the floor surface side winding mechanism 452*c*.

For example, the controller 12 (see FIG. 1) controls the ceiling side winding mechanism 452*a* and the floor surface side winding mechanism 452*c* (see FIG. 1) so that the robot hand 39 is concealed when viewed from the front yard 4 side on the basis of the position information of the robot hand 39. The controller 12 conceals at least a part of the shelf 402 from the back yard 5 side by controlling the ceiling side winding mechanism 452*a* and the floor surface side winding mechanism 452*c*.

According to the fourth embodiment, the shelf 402 includes a plurality of drawers 402*d* that can store the products 15. The store 401 further includes the first concealment mechanism 451 capable of concealing the drawer 402*d* that is being accessed by the robot hand 39 when viewed from the front yard 4 side. With the above configuration, the following effects are obtained. It is possible to improve the appearance of the shelf 402 by hiding the drawer 402*d* that is being accessed by the robot hand 39 using the first concealment mechanism 451. Further, it is possible to prevent the customer from touching the robot hand 39.

Further, the store 401 further includes the second concealment mechanism 452 capable of concealing at least a part of the shelf 402 from the back yard 5 side so that the robot hand 39 is concealed when viewed from the front yard 4 side, thereby obtaining the following effects. An appearance of the shelf 402 can be improved by concealing at least a part of the shelf 402 from the back yard 5 side so that the robot hand 39 is concealed when viewed from the front yard 4 side by the second concealment mechanism 452. Further, even when the robot hand 39 is positioned on the back yard 5 side, it is possible to prevent the customer from touching the robot hand 39.

Further, the controller 12 controls the ceiling side towing mechanism 451*b* and the floor surface side towing mechanism 451*d* to conceal the drawer 402*d* that is being accessed by the robot hand 39 when viewed from the front yard 4 side on the basis of the position information of the robot hand 39, thereby obtaining the following effects. It is possible to realize an in-store layout that can automatically conceal the drawer 402*d* that is being accessed by the robot hand 39 when viewed from the front yard 4 side.

Further, the controller 12 controls the ceiling side winding mechanism 452*a* and the floor surface side winding mechanism 452*c* so that the robot hand 39 is concealed when viewed from the front yard 4 side on the basis of the position information of the robot hand 39. The controller 12 conceals at least a part of the shelf 402 from the back yard 5 side by controlling the ceiling side winding mechanism 452*a* and the floor surface side winding mechanism 452*c*. With the above configuration, the following effects are obtained. It is possible to realize an in-store layout which can automatically conceal at least a part of the shelf 402 from the back yard 5 side so that the robot hand 39 is concealed when viewed from the front yard 4 side.

A modification example of the fourth embodiment will be described.

In the fourth embodiment, the case in which the store 401 includes both the first concealment mechanism 451 and the second concealment mechanism 452 has been described, but the present embodiment is not limited thereto. For example, the store 401 may include any one of the first concealment mechanism 451 and the second concealment mechanism 452. That is, the store 401 may include at least one of the first concealment mechanism 451 and the second concealment mechanism 452.

Further, in the fourth embodiment, the case in which the second concealment mechanism 452 can operate independently of the first concealment mechanism 451 has been described, but the present embodiment is not limited thereto. For example, the second concealment mechanism 452 may be operable in synchronization with the first concealment mechanism 451.

Further, in the fourth embodiment, a case in which the ceiling side curtain 452*b* and the floor surface side curtain 452*d* are movable up and down in synchronization with each other has been described, but the present embodiment is not limited thereto. For example, the ceiling side curtain 452*b* and the floor surface side curtain 452*d* may be separately independently movable up and down.

Further, in the fourth embodiment, the case in which the first concealment mechanism 451 includes the concealment plate and the second concealment mechanism 452 includes the curtain has been described, but the present embodiment is not limited thereto. For example, the first concealment mechanism 451 may include the curtain and the second concealment mechanism 452 may include the concealment plate. That is, the first concealment mechanism 451 and the second concealment mechanism 452 may include at least one of the concealment plate and the curtain.

In the fourth embodiment, the case in which the first concealment mechanism 451 and the second concealment mechanism 452 are automatically operated under the control of the controller 12 has been described, but the present embodiment is not limited thereto. For example, the first concealment mechanism 451 and the second concealment mechanism 452 may be operated manually.

A store of a fifth embodiment will be described.

Figure 13:
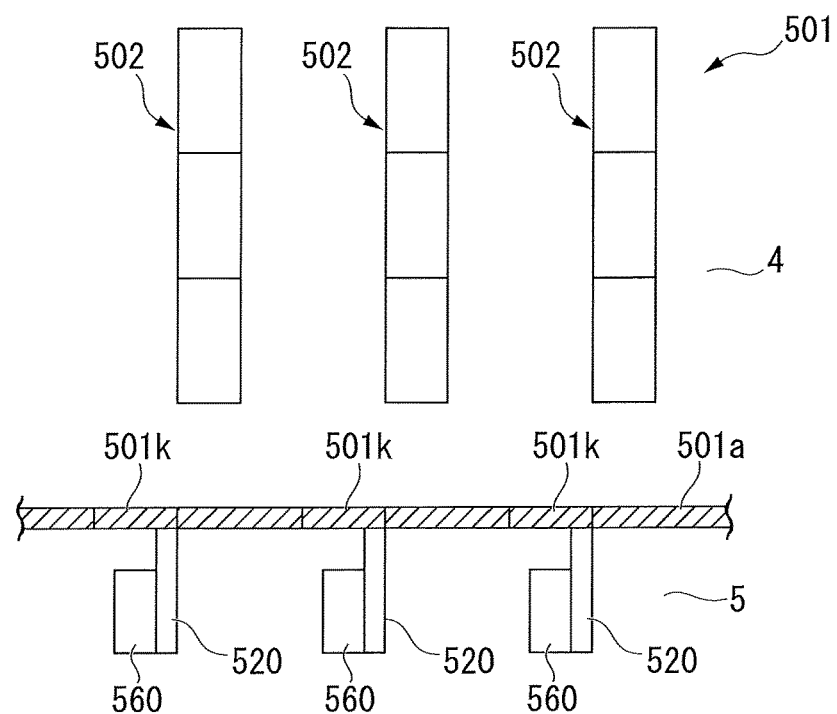
FIG. 13 is a plan view showing an in-store layout while a store is being opened in a fifth embodiment.

FIG. 13 is a plan view showing an in-store layout when a store 501 is being opened in the fifth embodiment.

Figure 14:
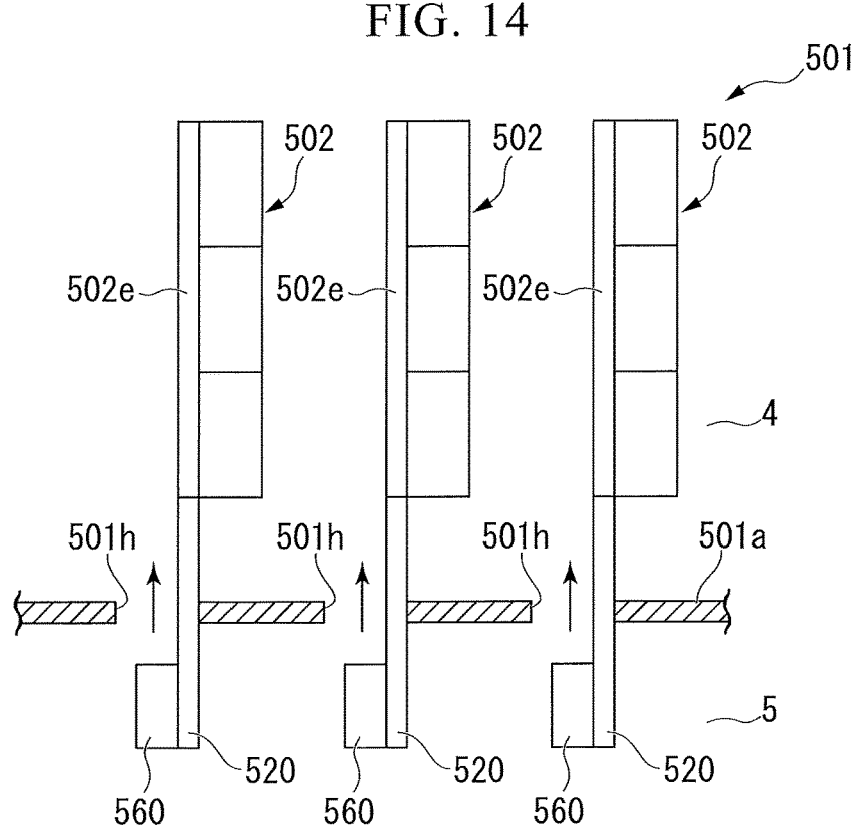
FIG. 14 is a plan view showing an in-store layout after the store has been opened in the fifth embodiment.

FIG. 14 is a plan view showing the in-store layout of the store 501 after sales of the fifth embodiment.

As shown in FIG. 13, the fifth embodiment is different from the first embodiment in the in-store layout. In the fifth embodiment, components that are the same as those of the first embodiment are denoted with the same reference numerals, and a detailed description thereof will be omitted here.

The store 501 includes a shelf 502, a front yard 4, a back yard 5, a wall 501a, a conveyor 520, and a moving picking robot 560.

In the store 501, a plurality of assembled shelves 502 are provided. In a top view of FIG. 13, the plurality of assembled shelves 502 have a straight shape. The collective shelf 502 includes three shelves adjacent to one another. A conveyor storage space (not shown) capable of storing the shelf side conveyor 502e (see FIG. 14) is provided in the collective shelf 502. FIG. 14 shows a state in which the shelf side conveyor 502e is taken out from the collective shelf 502.

The front yard 4 is positioned on the extraction area which the products 15 are taken out from the collective shelf 502. The back yard 5 is positioned on the side opposite to the front yard 4 with the wall 501a interposed therebetween. That is, the front yard 4 and the back yard 5 are partitioned by a wall 501a.

In a top view of FIG. 13, the wall 501a has a straight line shape extending in a direction orthogonal to the extending direction of the collective shelf 502. As shown in FIG. 14, the wall 501a includes an opening 501h through which the moving picking robot 560 and the conveyor 520 can pass. As shown in FIG. 13, a shutter 501k capable of opening and closing the opening 501h (see FIG. 14) is provided on the wall 501a. FIG. 13 shows a state in which the shutter 501k has closed the opening 501h (see FIG. 14). FIG. 14 shows a state in which the shutter 501k (see FIG. 13) has opened the opening 501h.

A plurality of conveyors 520 are provided in the back yard 5. Three conveyors 520 are provided to correspond to the plurality of assembled shelves 502. In a top view of FIG. 13, the conveyor 520 has a straight shape parallel to the extending direction of the collective shelf 502. In the back yard 5, a conveyor movement mechanism (not shown) capable of moving the conveyor 520 from the back yard 5 to the front yard 4 through the opening 501h (see FIG. 14) is provided.

The moving picking robot 560 is movable from the back yard 5 to the front yard 4 through the opening 501h (see FIG. 14). The moving picking robot 560 includes an elevation mechanism, a robot hand, and a robot mechanism (not shown). For example, the moving picking robot 560 corresponds to a moving picking robot in which the conveyor 220 is excluded from the robot system 209 of the second embodiment.

The in-store layout when the store 501 is being open will be described.

As shown in FIG. 13, when the store 501 is being open, the shelf side conveyor 502e is stored in a conveyor storage space (not shown). The opening 501h (see FIG. 14) of the wall 501a is closed by the shutter 501k. The conveyor 520 and the moving picking robot 560 are arranged in the back yard 5. The conveyor 520 and the moving picking robot 560 are concealed by the wall 501a and the shutter 501k such that they cannot be seen from the front yard 4 side.

The in-shop layout after the store 501 has been opened will be described.

As shown in FIG. 14, after the store 501 has been opened, the shelf side conveyor 502e is taken out from the conveyor storage space (not shown). The opening 501h of the wall 501a is opened by the shutter 501k (see FIG. 13). The conveyor 520 is moved to the front yard 4 through the opening 501h by a conveyor movement mechanism (not shown) and connected to the shelf side conveyor 502e. The moving picking robot 560 is movable to the front yard 4 through the opening 501h.

According to the fifth embodiment, the shelf side conveyor 502e is stored in a conveyor storage space (not shown) when the store 501 is open. Further, when the opening 501h of the wall 501a is closed by the shutter 501k, the conveyor 520 and the moving picking robot 560 are concealed when viewed from the front yard 4 side. Therefore, it is possible to realize an in-store layout in which customers can freely walk around the front yard 4 and products are easily taken out from the shelve 502 when the store 501 is open.

On the other hand, after the store 501 has been opened, the shelf side conveyor 502e is taken out from a conveyor storage space (not shown). Further, since the opening 501h of the wall 501a is opened by the shutter 501k, the conveyor 520 can be moved to the front yard 4 through the opening 501h and connected to the shelf side conveyor 502e. Further, the moving picking robot 560 can be moved to the front yard 4 through the opening 501h. Therefore, it is possible to realize an in-store layout in which automatic picking of products is able to be performed using the conveyor 520, the shelf side conveyor 502e, and the moving picking robot 560 after the store 501 has been opened.

A modification example of the fifth embodiment will be described.

In the fifth embodiment, a case in which the shelf side conveyor 502e is taken out from the conveyor storage space (not shown) after the store 501 has been opened has been described, but the present embodiment is not limited thereto. For example, the shelf side conveyor 502e may be stored in a conveyor storage space (not shown) after the store 501 has been opened. For example, after the store 501 has been opened, the conveyor 520 may be moved to the front yard 4 through the opening 501h and placed in front of the shelf 502. That is, the conveyor 520 may be placed in front of the shelf 502 instead of the shelf side conveyor 502e after the store 501 has been opened.

Further, in the fifth embodiment, the case in which the moving picking robot 560 is provided in the back yard 5 has been described, but the present embodiment is not limited thereto. For example, the moving picking robot 560 may be provided on the front yard 4. For example, the moving picking robot 560 may hold a product.

A store of the sixth embodiment will be described.

Figure 15:
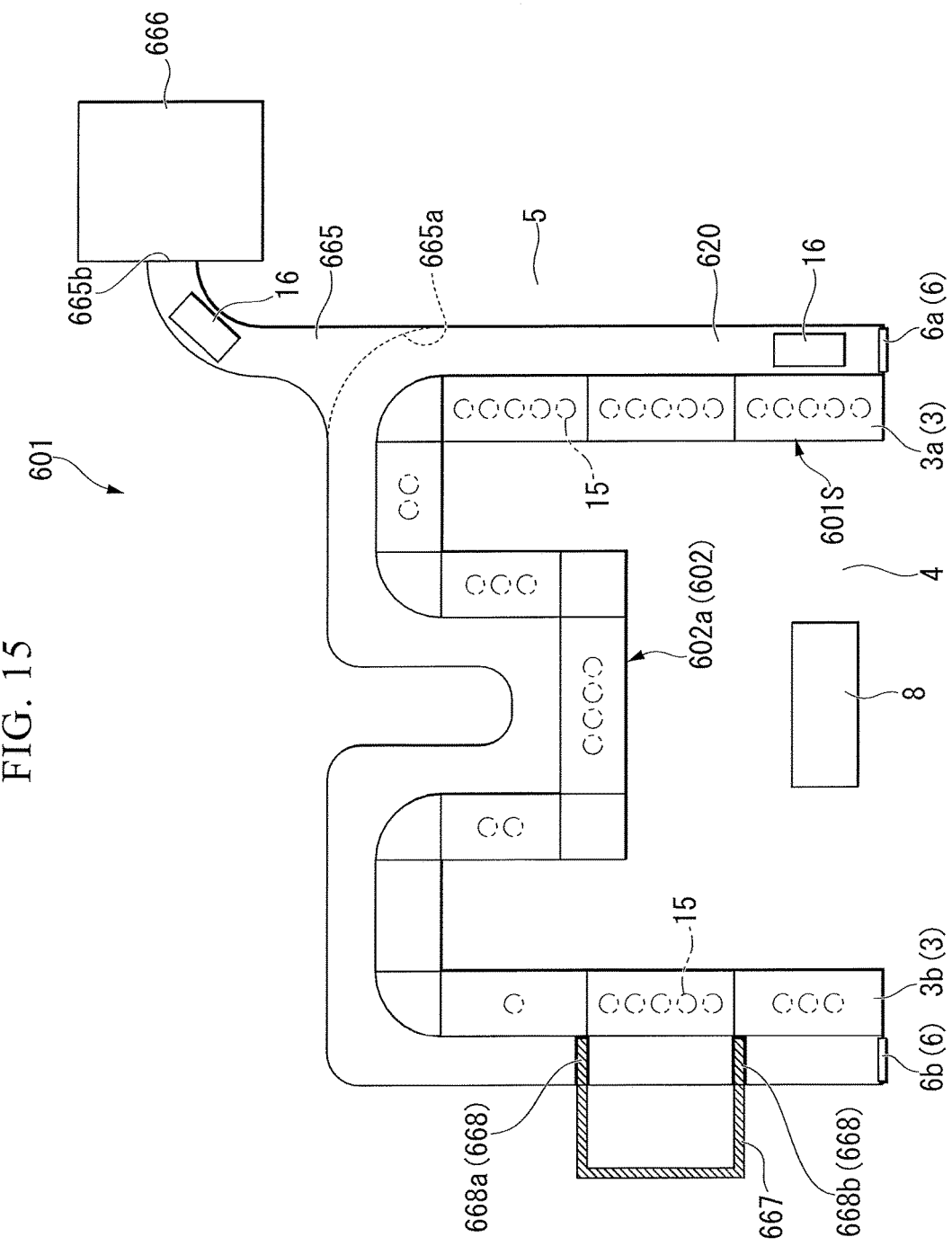
FIG. 15 is a plan view showing an in-store layout of a store according to a sixth embodiment.

FIG. 15 is a plan view showing an in-store layout of a store 601 of the sixth embodiment.

As shown in FIG. 15, the sixth embodiment is different from the first embodiment in the in-store layout. In the sixth embodiment, components that are the same as those of the first embodiment are denoted with the same reference numerals, and a detailed description thereof will be omitted here.

As shown in FIG. 15, the store 601 includes a shelf 602, a locker 3, a front yard 4, a back yard 5, a conveyor 620, a branch conveyor 665, a stock yard 666, a freezer compartment 667, and a register 8. In FIG. 15, the wall, the robot system, the container feeding mechanism, the controller and the like are omitted.

In the top view of FIG. 15, an M-shaped region 601S having an M shape is provided in the store 601.

An alignment shelf 602a is provided in the store 601. In the top view of FIG. 15, the alignment shelf 602a meanders. The alignment shelf 602a is an alignment shelf in which a plurality of shelves are aligned in the M-shaped region 601S. In the top view of FIG. 15, the alignment shelf 602a has an M shape. The alignment shelf 602a includes nine shelves.

The conveyor 620 will be described.

The conveyor 620 is arranged in the back yard 5. In the top view of FIG. 15, the conveyor 620 meanders. In the top view of FIG. 15, the conveyor 620 extends while meandering from the entrance door 6a toward the exit door 6b. The conveyor 620 is arranged along the M-shaped region 601 S. In the top view of FIG. 15, the conveyor 620 has an M shape.

The branch conveyor 665 will be described.

The branch conveyor 665 branches from the conveyor 620. In the top view of FIG. 15, the branch conveyor 665 extends along one side of the conveyor 620 and then laterally curves. In the branch conveyor 665, an end connected to the conveyor 620 serves as a start 665a of the branch conveyor 665. In the branch conveyor 665, an end opposite to the start 665a serves as an end 665b of the branch conveyor 665.

The stock yard 666 will be described.

The stock yard 666 is arranged at the end 665b of the branch conveyor 665. The stock yard 666 is a place at which the products 15 and the containers 16 are stocked.

The freezer compartment 667 will be described.

The freezer compartment 667 is arranged on a conveying path of the container 16. The freezer compartment 667 is provided adjacent to one shelf constituting the alignment shelf 602a. The freezer compartment 667 freezes the products 15 placed on the shelf adjacent to the freezer compartment 667.

The freezer compartment 667 includes a freezer compartment side door 668 through which the container 16 can enter and leave. The freezer compartment 667 has a plurality of freezer compartment side doors 668. The plurality of freezer compartment side doors 668 includes an upstream side door 668a and a downstream side door 668b. The upstream side door 668a is located on the upstream side of the conveying path of the container 16. The downstream side door 668b is located on the downstream side of the conveyance path of the container 16. The freezer compartment side door 668 detects the approach of the container 16 and is opened. For example, the freezer compartment side door 668 is an automatic door.

According to the sixth embodiment, the store 601 further includes the branch conveyor 665 and the stock yard 666. The branch conveyor 665 branches from the conveyor 620. The stock yard 666 is arranged at the end 665b of the branch conveyor 665. With the above configuration, the following effects are obtained. The products 15 and the container 16 can be stocked in the stock yard 666. Further, when a plurality of containers 16 including the first container and the second container are continuously conveyed, the first container can be directed to the branch conveyor 665. By directing the first container to the branch conveyor 665, the second container, which is conveyed after the first container, can be conveyed before the first container. That is, it is possible to perform overtaking of the containers.

Further, the store 601 further includes the freezer compartment 667 arranged on the conveying path of the container 16, thereby obtaining the following effects. The products 15 on the shelf adjacent to the freezer compartment 667 can be frozen. Further, the freezer compartment 667 includes the freezer compartment side door 668 that allows the container 16 to enter and leave, thereby providing the following effects. When the freezer compartment side door 668 is open, the container 16 can enter and leave through the freezer compartment side door 668. That is, it is not necessary to newly provide a conveyor for conveying the container 16 by bypassing the freezer compartment 667. Therefore, even in a case in which the container 16 is conveyed in the store 601 including the freezer compartment 667, it is possible to make the in-store layout compact.

A modification example of the sixth embodiment will be described.

In the sixth embodiment, the case in which the freezer compartment side door 668 detects the approach of the container 16 and is opened has been described, but the present embodiment is not limited thereto. For example, the freezer compartment side door 668 may open when reading a barcode provided in the container 16.

A store of a seventh embodiment will be described.

Figure 16:
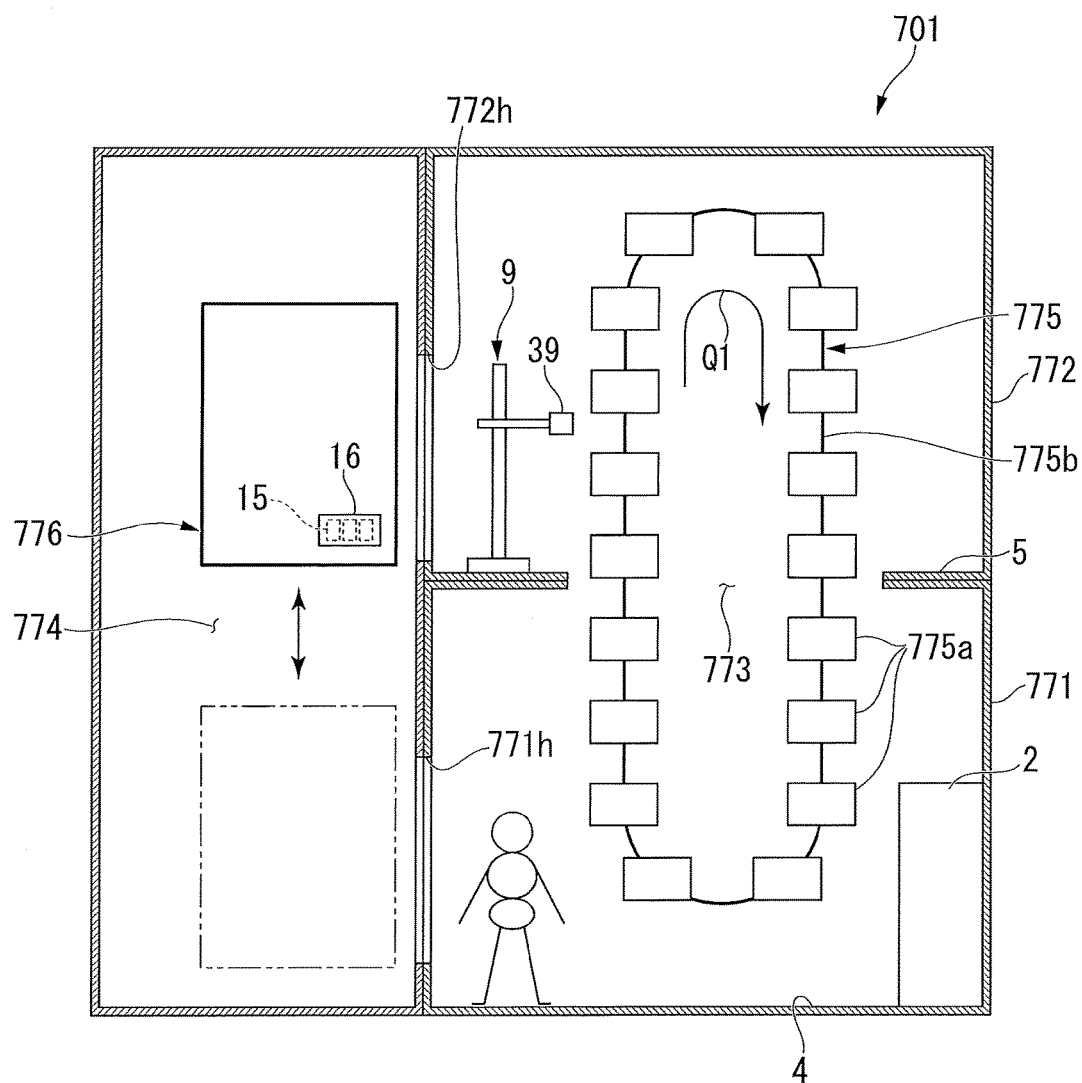
FIG. 16 is a view showing an in-store layout of a store according to a seventh embodiment.

FIG. 16 is a view showing an in-store layout of a store 701 of the seventh embodiment.

As shown in FIG. 16, the seventh embodiment is different from the first embodiment in the in-store layout. In the seventh embodiment, components that are the same as those in the first embodiment are denoted with the same reference numerals, and a detailed description thereof will be omitted here.

As shown in FIG. 16, the store 701 further includes a lower floor 771, an upper floor 772, a second elevator mechanism 775, and a third elevator mechanism 776. In FIG. 16, the container feeding mechanism, the controller, and the like are omitted.

The lower floor 771 will be described.

A shelf 2 is arranged on the lower floor 771. A lower layer side opening 771h is provided in the lower floor 771. The lower floor 771 functions as the front yard 4. For example, the lower floor 771 is a first floor.

The upper floor 772 will be described.

The upper floor 772 is a floor over the lower floor 771. The robot system 9 is provided on the upper floor 772. An upper layer side opening 772h is provided in the upper floor 772. The upper floor 772 functions as the back yard 5. For example, the upper floor 772 is a second floor. FIG. 16 shows an example in which the robot system 9 including the robot hand 39 is simplified.

The second elevator mechanism 775 will be described.

The second elevator mechanism 775 reciprocates in an open ceiling 773 between the lower floor 771 and the upper floor 772. The second elevator mechanism 775 reciprocates between the front yard 4 and the back yard 5 through the open ceiling 773. The second elevator mechanism 775 rotates about a shaft (not shown) (a direction of arrow Q1 in FIG. 16) while holding the plurality of shelves 775a with an annular connector 775b. For example, the second elevator mechanism 775 is a rotation shelf.

The third elevator mechanism 776 will be described.

The third elevator mechanism 776 reciprocates in a communication space 774 between the lower layer side opening 771h and the upper layer side opening 772h. The third elevator mechanism 776 reciprocates between the front yard 4 and the back yard 5 through the communication space 774. The third elevator mechanism 776 is positioned in front of the lower layer side opening 771h before movement to the upper floor 772 (refer to the alternating two-dots-dashed line in FIG. 16).

An operation flow of each element of the store 701 will be described.

For example, the third elevator mechanism 776 conveys the container 16 that is conveyed to the lower floor 771 and in which the product 15 is placed, to the upper floor 772. Then, the robot system 9 takes out the product 15 from the container 16 through the upper layer side opening 772h and displays the product 15 on the shelf 775a of the second elevator mechanism 775. Then, the second elevator mechanism 775 rotates in a direction indicated by an arrow Q1 while holding the shelf 775a on which the products 15 has been displayed. The product 15 of the shelf 775a is displayed on the shelf 2 of the lower floor 771.

On the other hand, the robot system 9 puts the emptied container 16 into the third elevator mechanism 776 through the upper layer side opening 772h. Then, the third elevator mechanism 776 conveys the emptied container 16 to the lower floor 771. For example, the emptied container 16 is conveyed by a conveying vehicle (not shown).

According to the seventh embodiment, the store 701 further includes the lower floor 771, the upper floor 772, and the second elevator mechanism 775. The second elevator mechanism 775 reciprocates between the lower floor 771 and the upper floor 772. With the above configuration, the following effects are obtained. The lower floor 771 is used as a store main body and it is possible to perform picking of the product 15 at the upper floor 772. That is, the upper floor 772 can be effectively utilized as a work area of the robot system 9. Therefore, it is possible to make the in-store layout compact in the store 701 including the lower floor 771 and the upper floor 772.

An insertion and extraction mechanism of an eighth embodiment will be described.

Figure 17:
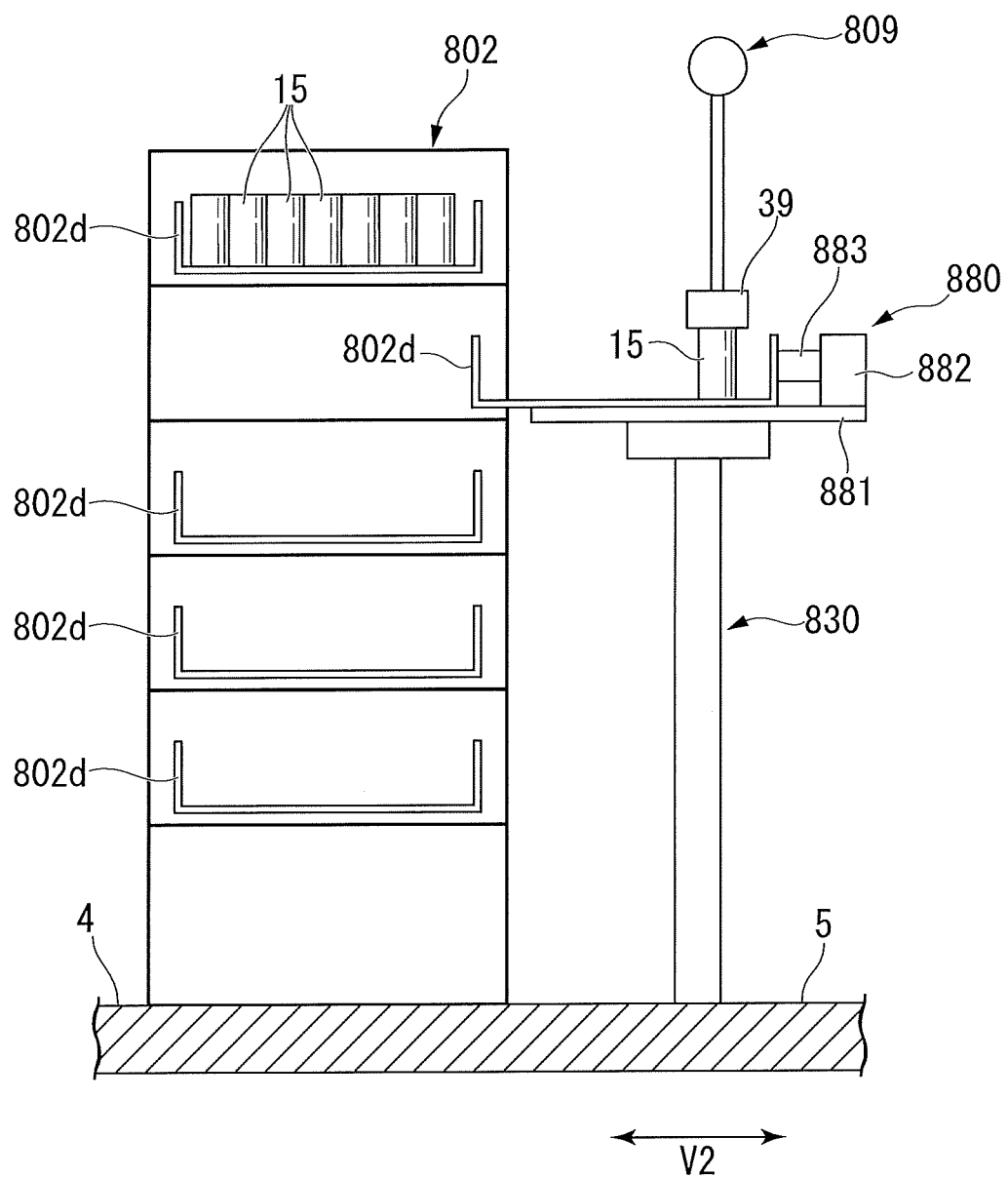
FIG. 17 is a side view showing an insertion and extraction mechanism of an eighth embodiment.

FIG. 17 is a side view showing an insertion and extraction mechanism 880 of the eighth embodiment.

As shown in FIG. 17, the eighth embodiment is different from the first embodiment in the configuration of the shelf 802. In the eighth embodiment, components that are the same as those of the first embodiment are denoted with the same reference numerals, and a detailed description thereof will be omitted here.

The shelf 802 will be described.

As shown in FIG. 17, the shelf 802 includes a plurality of drawers 802d that can store the products 15. In the side view of FIG. 17, five drawers 802d are arranged side by side in a vertical direction. FIG. 17 shows an example in which each element of the robot system 809 including the robot hand 39 is simplified.

The insertion and extraction mechanism 880 will be described.

The elevator mechanism 830 includes the insertion and extraction mechanism 880 capable of inserting and extracting the drawer 802d into and from the shelf 802. The insertion and extraction mechanism 880 is provided on the shelf 802 side. The insertion and extraction mechanism 880 includes a base 881, a slider 882, and an attractor 883.

The base 881 has a rectangular plate shape. The base 881 is moved up and down by the elevator mechanism 830.

The slider 882 is provided to be movable along the conveyor width direction V2 on the upper surface of the base 881. In other words, the slider 882 is provided to be capable of approaching and separating from the shelf 802.

The attractor 883 is attached to a surface of the slider 882 which faces the shelf 802. The attractor 883 can adsorb the drawer 802d. In FIG. 17, the drawer 802d is taken out from the shelf 802 by separating the slider 882 from the shelf 802 in a state in which the drawer 802d is adsorbed by the attractor 883 is shown.

According to the eighth embodiment, the shelf 802 includes the drawer 802d that can store the products 15. The elevator mechanism 830 includes the insertion and extraction mechanism 880 capable of inserting and extracting the drawer 802d into and from the shelf 802. With the above configuration, the following effects are obtained. When the product 15 is put in the drawer 802d in the shelf 802, it is necessary to move the robot hand 39 in a direction intersecting a vertical line using the robot mechanism. According to the eighth embodiment, the product 15 can be put in the drawer 802d from above while the drawer 802d is extracted from the shelf 802 by the insertion and extraction mechanism 880. That is, it is not necessary to move the robot hand 39 in a direction intersecting the vertical line using the robot mechanism. Therefore, it is possible to make an operation range of the robot hand 39 compact.

A modification example of the eighth embodiment will be described.

In the eighth embodiment, the case in which the drawer 802d can be inserted into and extracted from the shelf 802 has been described, but the present embodiment is not limited thereto. For example, a container may be inserted into and extracted from the shelf 802 instead of the drawer 802d. That is, the container may be stored in the shelf 802.

An arrangement of cameras of a ninth embodiment will be described.

Figure 18:
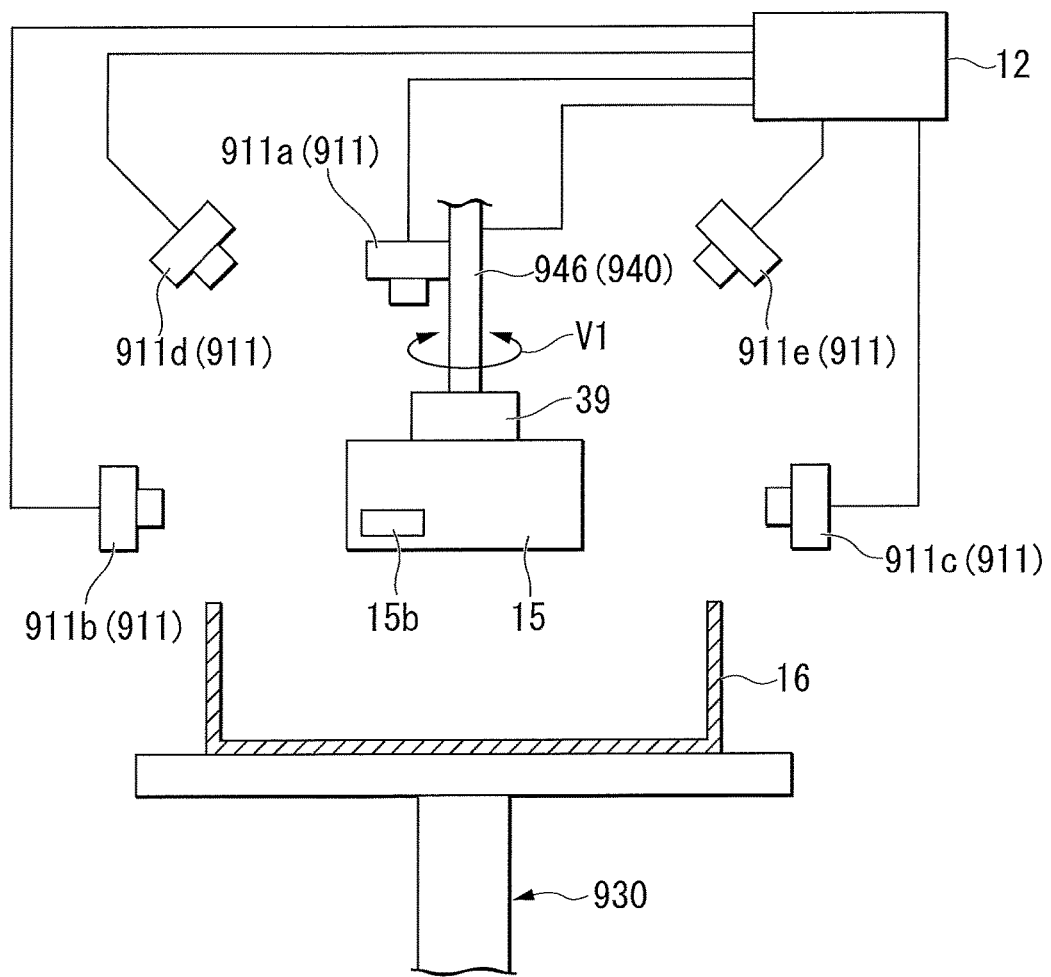
FIG. 18 is a diagram showing an arrangement of cameras according to a ninth embodiment.

FIG. 18 is a diagram showing an arrangement of the cameras 911 of the ninth embodiment.

As shown in FIG. 18, the ninth embodiment is different from the first embodiment in the arrangement of the cameras 911. In the ninth embodiment, components that are the same as those of the first embodiment are denoted with the same reference numerals, and a detailed description thereof will be omitted here.

As shown in FIG. 18, a plurality of cameras 911 are provided around the robot hand 39. The plurality of cameras 911 include a hand side camera 911a, a shelf side camera 911b, a wall side camera 911c, a first ceiling side camera 911d, and a second ceiling side camera 911e.

The hand side camera 911a is attached to a hand rotation mechanism 946 capable of rotating the robot hand 39 in a direction indicated by an arrow U1.

For example, the shelf side camera 911b is attached to a shelf (not shown).

For example, the wall side camera 911c is attached to a wall (not shown).

The first ceiling side camera 911d and the second ceiling side camera 911e are arranged on the ceiling side. For example, the first ceiling side camera 911d and the second ceiling side camera 911e are attached to a carriage (not shown).

On the product 15, information 15b including an expiration date of the product 15 is displayed. At least one of the cameras 911 is capable of imaging the information 15b of the product 15. For example, the information 15b is a barcode or text.

The controller 12 will be described.

The controller 12 acquires the information 15b of the product 15 on the basis of an imaging result of the camera 911. The controller 12 controls the robot hand 39 and the robot mechanism 940 to arrange new products among the products 15 on one side of the shelf and old products on the other side of the shelf, and collect the expired products in the container 16. In FIG. 18, the container 16 is supported from below by an elevator mechanism 930.

For example, an expiration threshold value may be set between production of a product 15 and an expiration date thereof. The controller 12 may determine that a product within the expiration threshold value among the products 15 is a new product. The controller 12 may determine that a product that has passed the expiration threshold value and is within the expiration date among the products 15 is an old product. The controller 12 determines that the product that has passed the expiration date is an expired product.

When the controller 12 determines that the product 15 is new, the controller 12 controls the robot hand 39 and the robot mechanism 940 to place the new product 15 on the front yard side of the shelf.

When the controller 12 determines that the product 15 is old, the controller 12 controls the robot hand 39 and the robot mechanism 940 to place the old product 15 on the back yard side of the shelf.

When the controller 12 determines that the expiration date of the product 15 has expired, the controller 12 controls the robot hand 39 and the robot mechanism 940 to take out the expired product 15 from the shelf and collect the expired products 15 in the container 16.

According to the ninth embodiment, the information 15b including the expiration date of the product 15 is displayed on the product 15. The controller 12 acquires the information 15b on the basis of the imaging result of the camera 911. The controller 12 controls the robot hand 39 and the robot mechanism 940 to arrange a new product among the products 15 on one side of the shelf and an old product on the other side of the shelf and collect the expired products in the container 16. With the above configuration, the following effects are obtained. It is possible to automatically perform arrangement of the new product 15 on the customer side, arrangement of the old product 15 on the back side, and the collection of the expired product 15.

Further, when the elevator mechanism 830 of the eighth embodiment is further included, the products 15 can be put in the drawer 802d from above in a state in which the drawer 802d is extracted from the shelf 802 by the insertion and extraction mechanism 880 (see FIG. 17). Therefore, it is possible to easily perform arrangement of the new product 15 on the customer side, arrangement of the old product 15 on the back side, and the collection of the expired product 15.

Further, when a base hand rotation mechanism 946 of the robot hand 39 is provided, the robot hand 39 can be rotated. Therefore, the present embodiment is preferable because it is possible to search for the information 15b displayed on the product 15 by rotating the product 15.

A modification example of the ninth embodiment will be described.

In the ninth embodiment, the case in which a plurality of cameras 911 are provided around the robot hand 39 has been described, but the present embodiment is not limited thereto. For example, cameras may be provided in the drawer, the container 16, and the like.

Another modification example of the embodiment will be described.

In the above embodiment, the case in which the store is a convenience store has been described, but the present embodiment is not limited thereto. For example, the store may be a building such as a distribution center.

Further, in the above-described embodiment, the case in which the conveyor is a roller conveyor in which containers are placed on a plurality of rollers and conveyed has been described, but the present embodiment is not limited thereto. For example, when the container is placed to be suspended from the upper side, the conveyor may be a belt conveyor in which the container is placed on a belt and conveyed.

According to at least one of the embodiments described above, it is possible to provide the store 1 capable of achieving a compact in-store layout by including the shelf 2 on which the products 15 can be displayed, the conveyor 20 that is arranged along the shelf 2 and conveys the container 16 in which the products 15 are placed, the elevator mechanism 30 that moves the container 16 up and down, the robot hand 39 capable of gripping the product 15, and the robot mechanism 40 that performs positioning of the robot hand 39 and overlapping at least a part of the conveyor 20 in a top view.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A store comprising:
    a shelf that is capable of displaying products thereon;
    a conveyor that is arranged along the shelf and to convey a container in which a product is placed, the conveyor having a width orthogonal to a conveyor extending direction and parallel to a horizontal plane;
    an elevator mechanism to move the container up and down;
    a robot hand capable of griping the product; and
    a robot mechanism to position the robot hand and to entirely overlap the conveyor in a top view, wherein the robot mechanism is arranged to be within the width of the conveyor in the top view.

2. The store according to claim 1, further comprising:
    a front yard that is located on an extraction area which the product is taken out from the shelf; and
    a back yard that is located on a side opposite to the front yard with the shelf interposed therebetween and in which the conveyor, the elevator mechanism, and the robot mechanism are arranged.

3. The store according to claim 1, wherein the conveyor is a roller conveyor in which a plurality of rollers are arranged with a gap therebetween, and
    the elevator mechanism includes a gap passing member to move up and down through the gap.

4. The store according to claim 1, further comprising:
    doors that are arranged at a start and an end of the conveyor and through which the container enters and leaves.

5. The store according to claim 1, further comprising:
    a branch conveyor that branches from the conveyor, and
    a stock yard that is arranged at an end of the branch conveyor.

6. The store according to claim 1, further comprising:
    a lower floor on which the shelf is arranged,
    an upper floor over the lower floor, and
    a second elevator mechanism that reciprocates between the lower floor and the upper floor.

7. The store according to claim 1, wherein the shelf and the conveyor meander with respect to each other in the top view.

8. The store according to claim 1, wherein the shelf is provided with a conveyor storage space that is capable of storing the conveyor and is provided in the shelf.

9. The store according to claim 1, wherein the shelf includes a drawer capable of storing the product, and
the elevator mechanism includes an insertion and extraction mechanism capable of inserting and extracting the drawer into and from the shelf.

10. The store according to claim 1, further comprising:
a freezer compartment that is arranged on a conveying path of the container,
wherein the freezer compartment includes a freezer compartment side door through which the container enters and leaves.

11. The store according to claim 1, further comprising:
a camera capable of imaging the product; and
a controller to control the robot hand and the robot mechanism based on an imaging result of the camera.

12. The store according to claim 11, wherein information including an expiration date of the product is displayed on the product, and
the controller to acquire the information based on the imaging result of the camera, to place a new product among the products on one side of the shelf and an old product on the other side of the shelf, and to control the robot hand and the robot mechanism so that an expired product is collected in the container.

13. The store according to claim 11, wherein a label of the product is provided on the product, and
the controller to acquire position information of the label based on the imaging result of the camera and control the robot hand and the robot mechanism and thereby direct to one side of the shelf.

14. The store according to claim 1, wherein the shelf includes a drawer capable of storing the product, further comprising:

a first concealment mechanism capable of concealing the drawer that is being accessed by the robot hand when viewed from an extraction area which the product is taken out from the shelf.

15. The store according to claim 14, further comprising:
a second concealment mechanism capable of concealing at least a part of the shelf from a side opposite to the extraction area which the product is taken out from the shelf so that the robot hand is concealed when viewed from the extraction area.

16. A robot system comprising:
a conveyor to convey a container in which a product is placed, the conveyor having a width orthogonal to a conveyor extending direction and parallel to a horizontal plane;
an elevator mechanism to move the container up and down;
a robot hand capable of griping the product; and
a robot mechanism to position the robot hand and to entirely overlap the conveyor in a top view, wherein
the robot mechanism is arranged to be within the width of the conveyor in the top view.

17. The robot system according to claim 16, wherein the conveyor is a roller conveyor in which a plurality of rollers are arranged with a gap therebetween, and
the elevator mechanism includes a gap passing member to move up and down through the gap.

18. The robot system according to claim 17, wherein the gap passing member is a meshing chain.

19. The robot system according to claim 17, wherein the gap passing member is a fork.

20. The robot system according to claim 16, wherein the elevator mechanism comprises:
an elevation mechanism to move the container up and down; and
a movement mechanism capable of moving the elevation mechanism in a direction along the conveyor.

* * * * *